United States Patent
Takano

(10) Patent No.: US 9,524,133 B2
(45) Date of Patent: Dec. 20, 2016

(54) PRINTING SERVER GROUP INCLUDING A PRINT SERVICE OF TRANSFERRING A PRINT JOB TO A PRINTER VIA A NETWORK

(71) Applicant: Shinichi Takano, Yokohama (JP)

(72) Inventor: Shinichi Takano, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/207,185

(22) Filed: Mar. 12, 2014

(65) Prior Publication Data

US 2015/0261482 A1 Sep. 17, 2015
US 2016/0239246 A9 Aug. 18, 2016

(30) Foreign Application Priority Data

Apr. 12, 2013 (JP) .................................. 2013-084357

(51) Int. Cl.
*G06F 3/12* (2006.01)

(52) U.S. Cl.
CPC ........... *G06F 3/1236* (2013.01); *G06F 3/1205* (2013.01); *G06F 3/1258* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 2005/0046876 A1* | 3/2005 | Burget | G06F 3/1222 358/1.1 |
| 2012/0254898 A1* | 10/2012 | Nakata | G06F 9/4411 719/324 |
| 2013/0155462 A1* | 6/2013 | Selvaraj | G06F 3/1205 358/1.15 |
| 2013/0185426 A1* | 7/2013 | Chevillat | G06Q 50/01 709/225 |
| 2014/0078541 A1 | 3/2014 | Takano | |

FOREIGN PATENT DOCUMENTS

JP 2006-244321 A 9/2006

* cited by examiner

*Primary Examiner* — John Wallace
(74) *Attorney, Agent, or Firm* — Fitzpatrick, Cella, Harper & Scinto

(57) ABSTRACT

A printing system comprises: an obtaining unit which obtains information about a printer, a first user, and a print server; a storing unit which generates, based on the information, a printer object used when using the printer via the print service, and stores the generated printer object in association with the information of the print server which manages the printer; a providing unit which, if the first user selects the print server, provides a setting window for instructing to share, with a second user, a plurality of printers managed by the selected print server; and a changing unit which changes a state of printer objects of the respective printers to a shared state to allow the second user to use the printer objects of the respective printers managed by the selected print server if sharing is instructed.

8 Claims, 26 Drawing Sheets

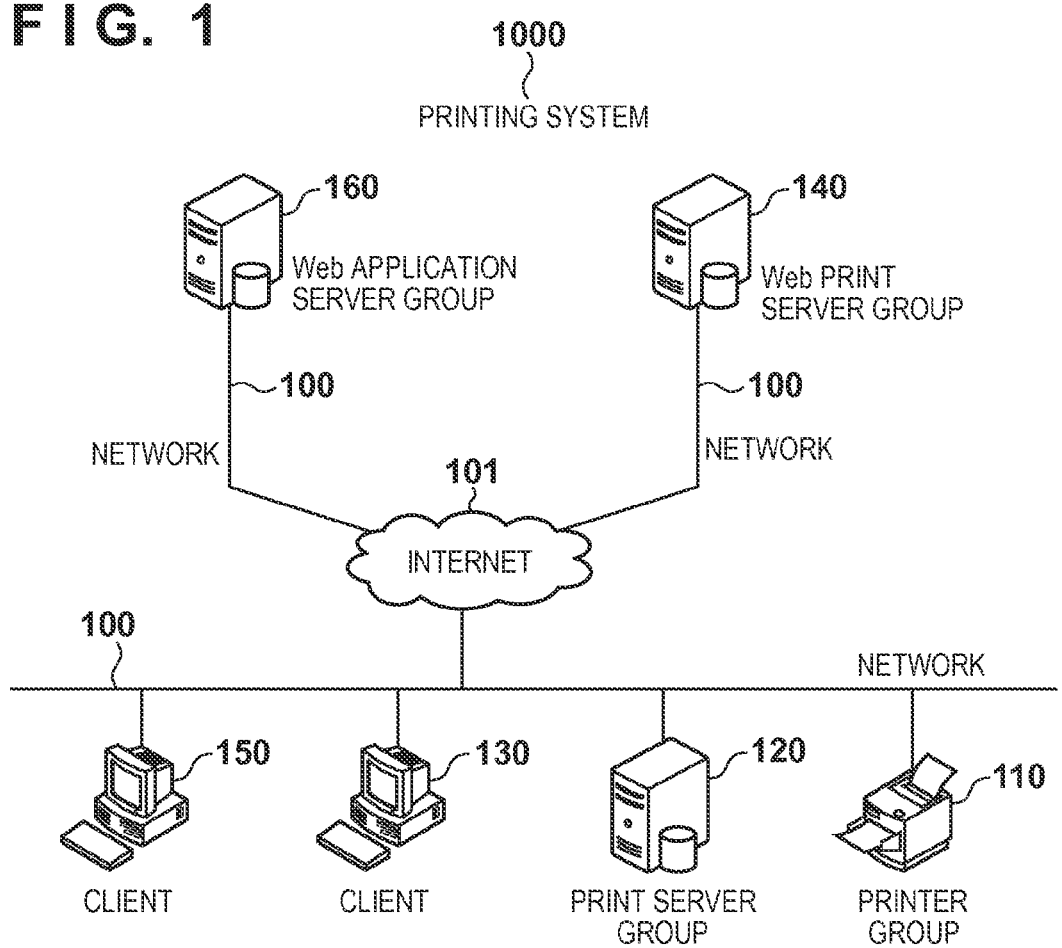
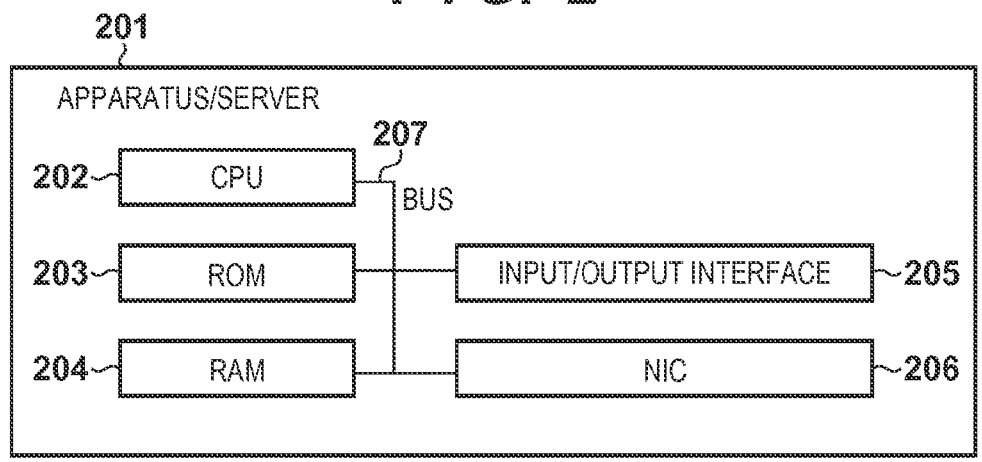

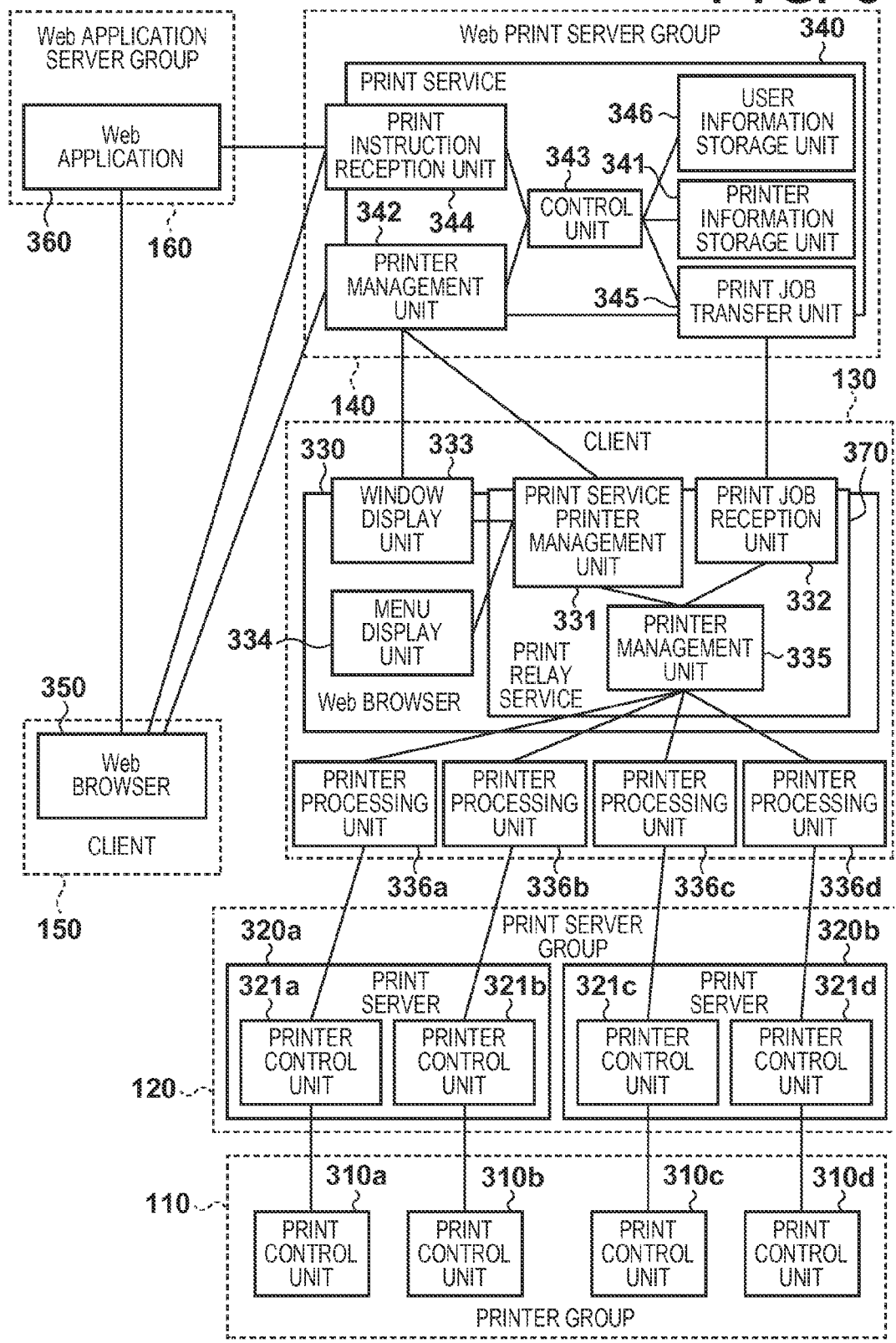

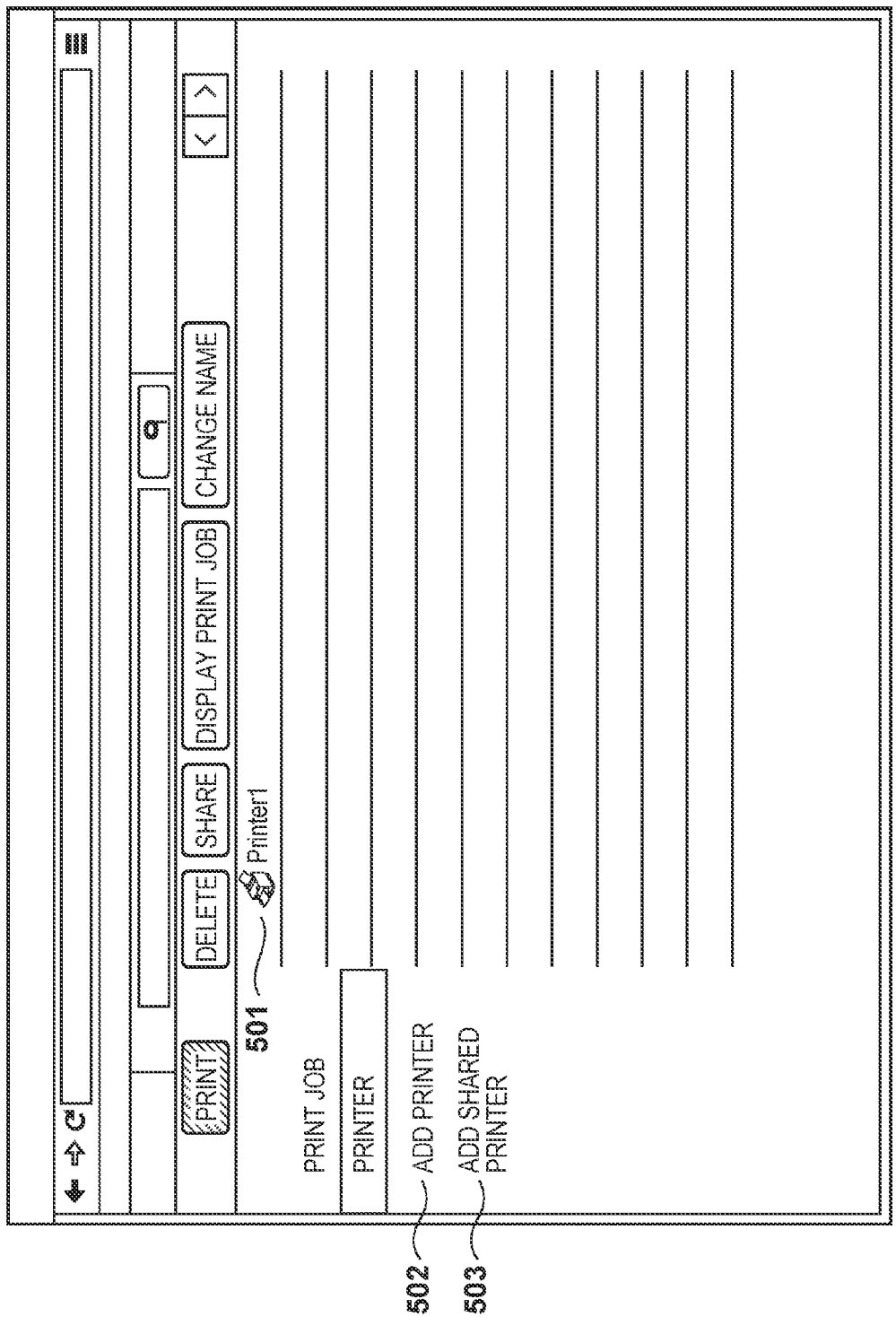

FIG. 6A

| 601 | 602 |
|---|---|
| USER ACCOUNT | PASSWORD |
| Owner_M | t4j3t4j |
| UserA | gj34gj4 |
| UserB | g5jky04 |
| UserC | s20yg03 |
| UserD | jg2g00j |
| UserE | tj2ig04 |

FIG. 6B

| 610 | 611 |
|---|---|
| GROUP ACCOUNT | USER ACCOUNT |
| GroupX | UserA |
| GroupX | UserB |
| GroupX | UserC |
| GroupY | UserD |
| GroupY | UserE |

FIG. 6C

| 620 | 621 | 622 | 623 | 624 | 625 | 626 | 627 | 628 | 629 |
|---|---|---|---|---|---|---|---|---|---|
| SPID | PRINTER ADMINISTRATOR | PRINTER NAME | PROXY ID | PRINT SERVER | RPID | CAPABILITIES | PRINT SETTING INITIAL VALUE | SHARING USER | SHARING USER STATUS |
| 5842 | Owner_M | Printer1 | Proxy-S | PrnSrv-X | RP-001 | PrnCaps-1 | PrnTicket-1 | - | - |
| 1506 | Owner_M | Printer2 | Proxy-S | PrnSrv-X | RP-002 | PrnCaps-2 | PrnTicket-2 | - | - |
| 5126 | Owner_M | Printer3 | Proxy-S | PrnSrv-X | RP-003 | PrnCaps-3 | PrnTicket-3 | - | - |
| 1912 | Owner_M | Printer4 | Proxy-S | PrnSrv-Y | RP-004 | PrnCaps-4 | PrnTicket-4 | - | - |
| 4866 | Owner_M | Printer5 | Proxy-S | PrnSrv-Y | RP-005 | PrnCaps-5 | PrnTicket-5 | - | - |
| 4814 | Owner_M | Printer6 | Proxy-T | PrnSrv-Z | RP-006 | PrnCaps-6 | PrnTicket-6 | - | - |
| 7423 | Owner_M | Printer7 | Proxy-T | PrnSrv-Z | RP-007 | PrnCaps-7 | PrnTicket-7 | - | - |

FIG. 6D

| 620 | 621 | 622 | 623 | 624 | 625 | 626 | 627 | 628 | 629 |
|---|---|---|---|---|---|---|---|---|---|
| SPID | PRINTER ADMINISTRATOR | PRINTER NAME | PROXY ID | PRINT SERVER | RPID | CAPABILITIES | PRINT SETTING INITIAL VALUE | SHARING USER | SHARING USER STATUS |
| 5842 | Owner_M | Printer1 | Proxy-S | PmSrv-X | RP-001 | PmCaps-1 | PmTicket-1 | GroupX | - |
| 1506 | Owner_M | Printer2 | Proxy-S | PmSrv-X | RP-002 | PmCaps-2 | PmTicket-2 | GroupX | - |
| 5126 | Owner_M | Printer3 | Proxy-S | PmSrv-X | RP-003 | PmCaps-3 | PmTicket-3 | GroupX | - |
| 1912 | Owner_M | Printer4 | Proxy-S | PmSrv-Y | RP-004 | PmCaps-4 | PmTicket-4 | - | - |
| 4866 | Owner_M | Printer5 | Proxy-S | PmSrv-Y | RP-005 | PmCaps-5 | PmTicket-5 | - | - |
| 4814 | Owner_M | Printer6 | Proxy-T | PmSrv-Z | RP-006 | PmCaps-6 | PmTicket-6 | - | - |
| 7423 | Owner_M | Printer7 | Proxy-T | PmSrv-Z | RP-007 | PmCaps-7 | PmTicket-7 | - | - |

FIG. 6E

| 620 | 621 | 622 | 623 | 624 | 625 | 626 | 627 | 628 | 629 |
|---|---|---|---|---|---|---|---|---|---|
| SPID | PRINTER ADMINISTRATOR | PRINTER NAME | PROXY ID | PRINT SERVER | RPID | CAPABILITIES | PRINT SETTING INITIAL VALUE | SHARING USER | SHARING USER STATUS |
| 5842 | Owner_M | Printer1 | Proxy-S | PmSrv-X | RP-001 | PmCaps-1 | PmTicket-1 | GroupX | - |
| 1506 | Owner_M | Printer2 | Proxy-S | PmSrv-X | RP-002 | PmCaps-2 | PmTicket-2 | GroupX | UserA : Share |
| 5126 | Owner_M | Printer3 | Proxy-S | PmSrv-X | RP-003 | PmCaps-3 | PmTicket-3 | GroupX | - |
| 1912 | Owner_M | Printer4 | Proxy-S | PmSrv-Y | RP-004 | PmCaps-4 | PmTicket-4 | GroupY | - |
| 4866 | Owner_M | Printer5 | Proxy-S | PmSrv-Y | RP-005 | PmCaps-5 | PmTicket-5 | GroupY | - |
| 4814 | Owner_M | Printer6 | Proxy-T | PmSrv-Z | RP-006 | PmCaps-6 | PmTicket-6 | - | - |
| 7423 | Owner_M | Printer7 | Proxy-T | PmSrv-Z | RP-007 | PmCaps-7 | PmTicket-7 | - | - |

F I G. 7A

```
<Capabilities>
    <Duplex>
        <Item>1-Side</Item>
        <Item>2-Side</Item>
    </Duplex>
    <Color>
        <Item>mono</Item>
        <Item>color</Item>
    </Color>
    <PaperSize>
        <Item>B5</Item>
        <Item>A4</Item>
        <Item>A3</Item>
    </PaperSize>
</Capabilities>
```

F I G. 7B

```
<PrintSettings>
    <Duplex>
        <Item>1-Side</Item>
    </Duplex>
    <Color>
        <Item>color</Item>
    </Color>
    <PaperSize>
        <Item>A4</Item>
    </PaperSize>
</PrintSettings>
```

FIG. 7C

```xml
<Register>
    <name>
        <Item>Printer1</Item>
    </name>
    <proxy>
        <Item>Proxy-A</Item>
    </proxy>
    <PrintServer>
        <Item>PmSrv-X</Item>
    </PrintServer>
    <Capabilities>
        <Duplex>
            <Item>1-Side</Item>
            <Item>2-Side</Item>
        </Duplex>
        <Color>
            <Item>mono</Item>
            <Item>color</Item>
        </Color>
        <PaperSize>
            <Item>B5</Item>
            <Item>A4</Item>
            <Item>A3</Item>
        </PaperSize>
    </Capabilities>
    <PrintSettings>
        <Duplex>
            <Item>1-Side</Item>
        </Duplex>
        <Color>
            <Item>color</Item>
        </Color>
        <PaperSize>
            <Item>A4</Item>
        </PaperSize>
    </PrintSettings>
    <status>
        <Item>online</Item>
    </status>
    ...
</Register>
```

FIG. 7D

```
<Printers>
    <name>
        <Item>Printer1</Item>
    </name>
    <PrintServer>
        <Item>PmSrv-X</Item>
    </PrintServer>
    <Capabilities>
        <Duplex>
            <Item>1-Side</Item>
            <Item>2-Side</Item>
        </Duplex>
        <Color>
            <Item>mono</Item>
            <Item>color</Item>
        </Color>
        <PaperSize>
            <Item>B5</Item>
            <Item>A4</Item>
            <Item>A3</Item>
        </PaperSize>
    </Capabilities>
    <PrintSettings>
        <Duplex>
            <Item>1-Side</Item>
        </Duplex>
        <Color>
            <Item>color</Item>
        </Color>
        <PaperSize>
            <Item>A4</Item>
        </PaperSize>
    </PrintSettings>
    ...
</Printers>
```

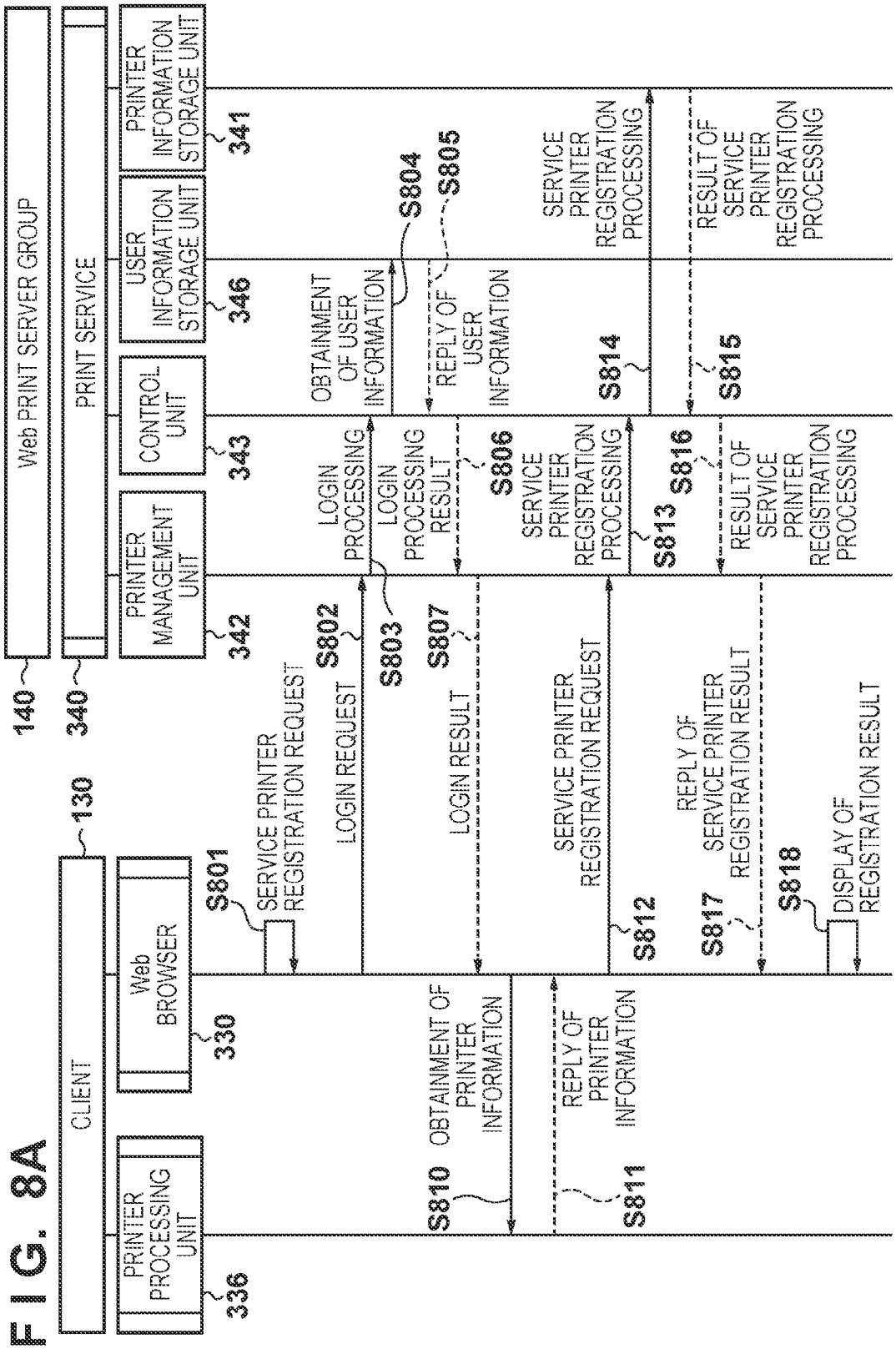

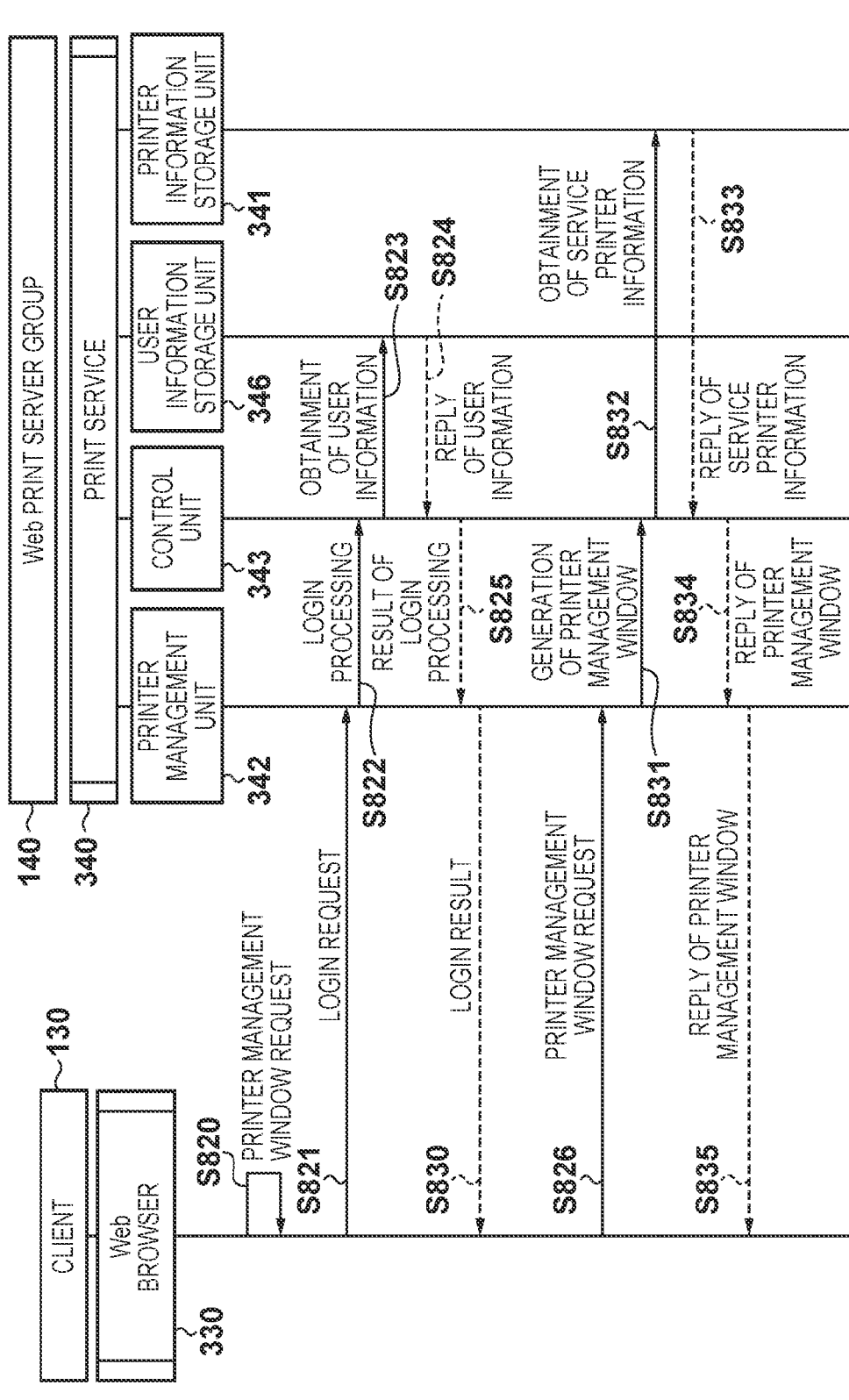

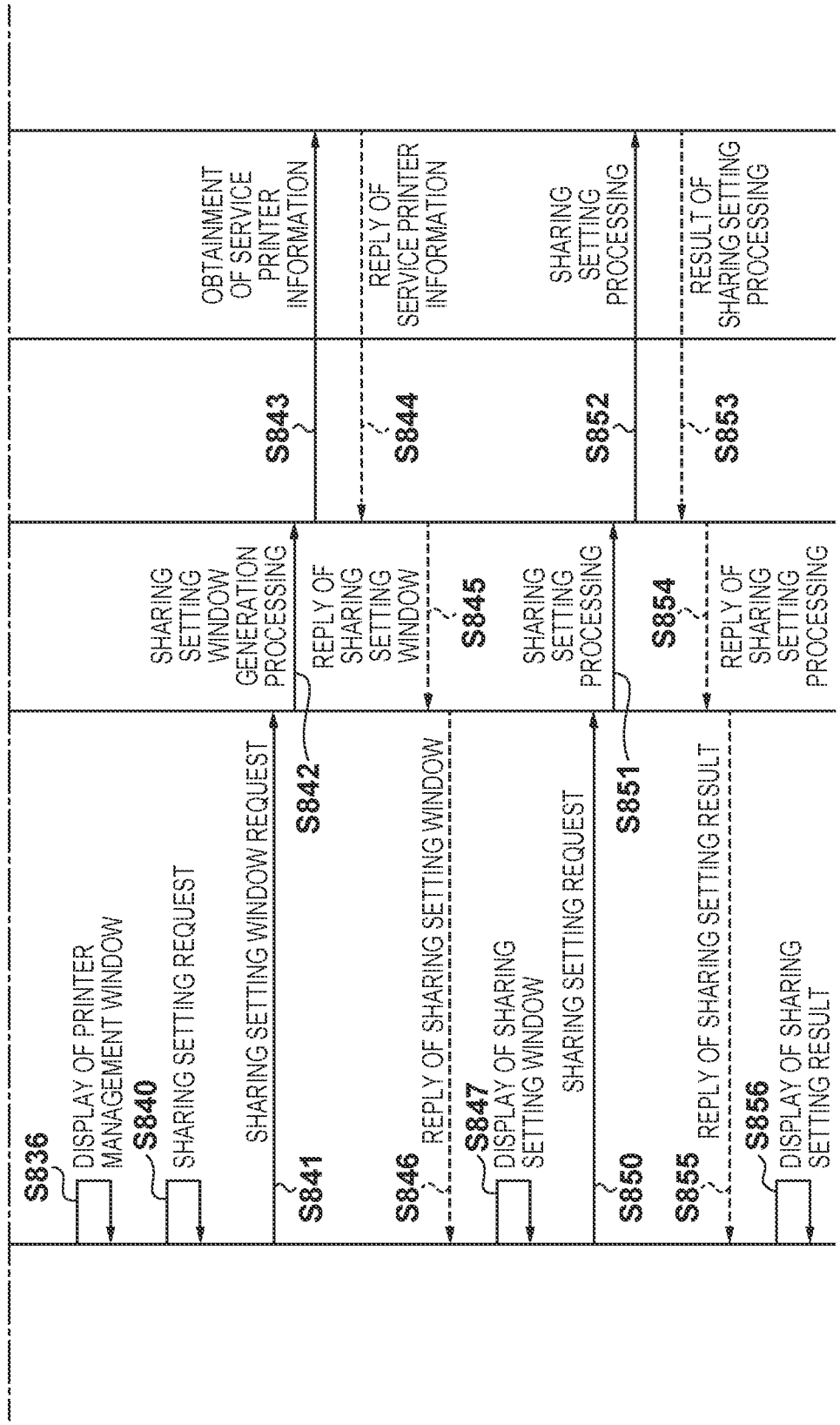

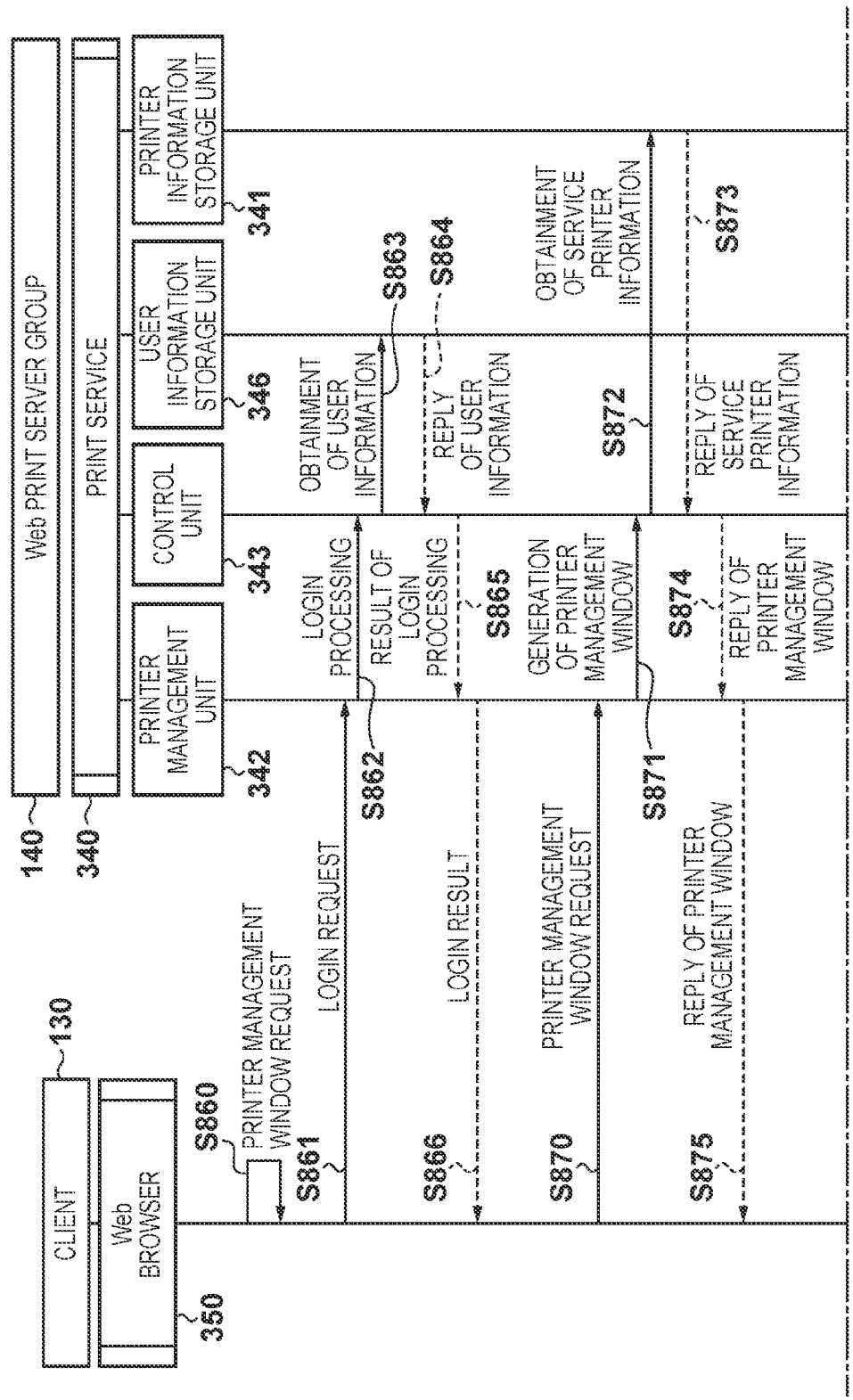

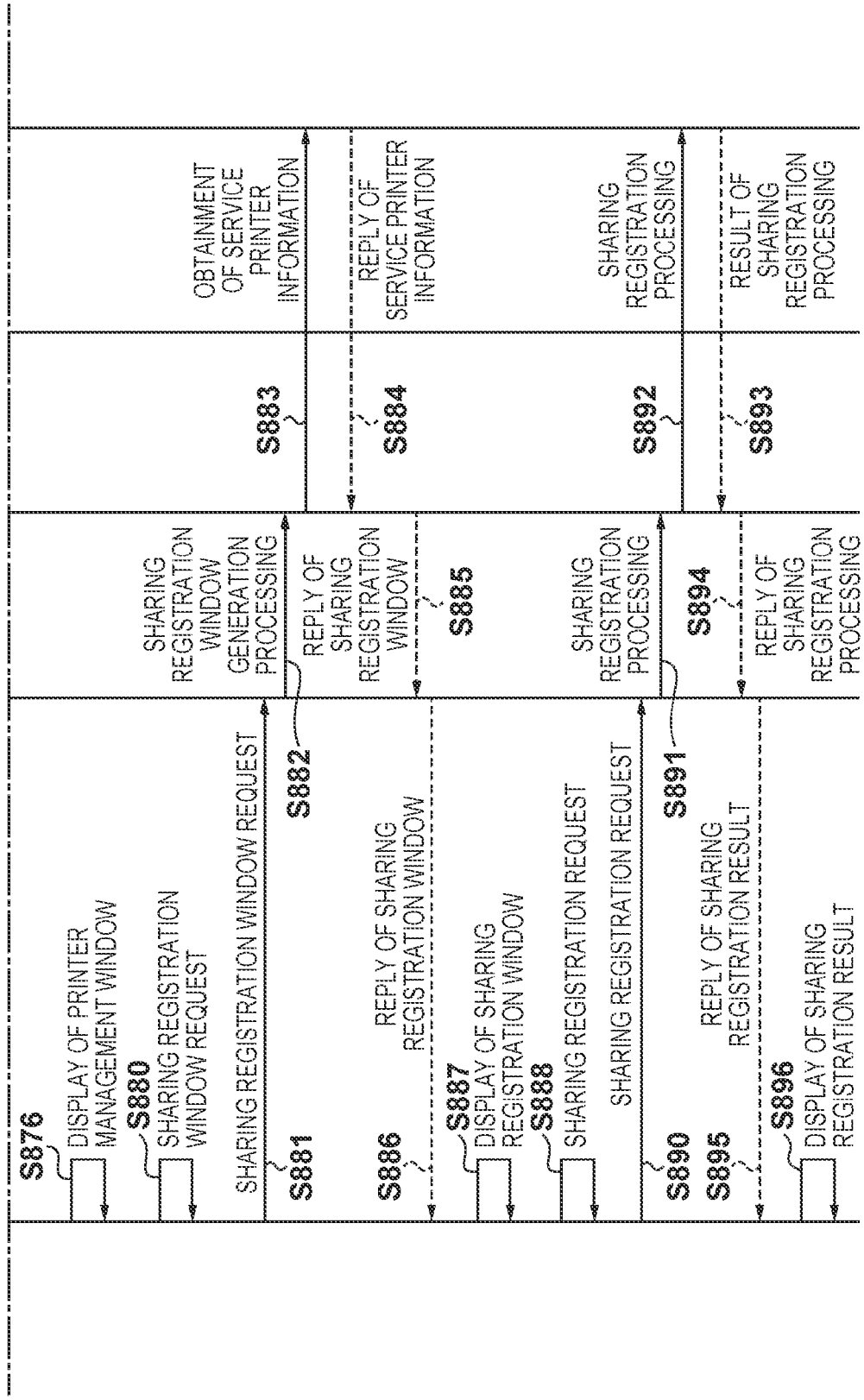

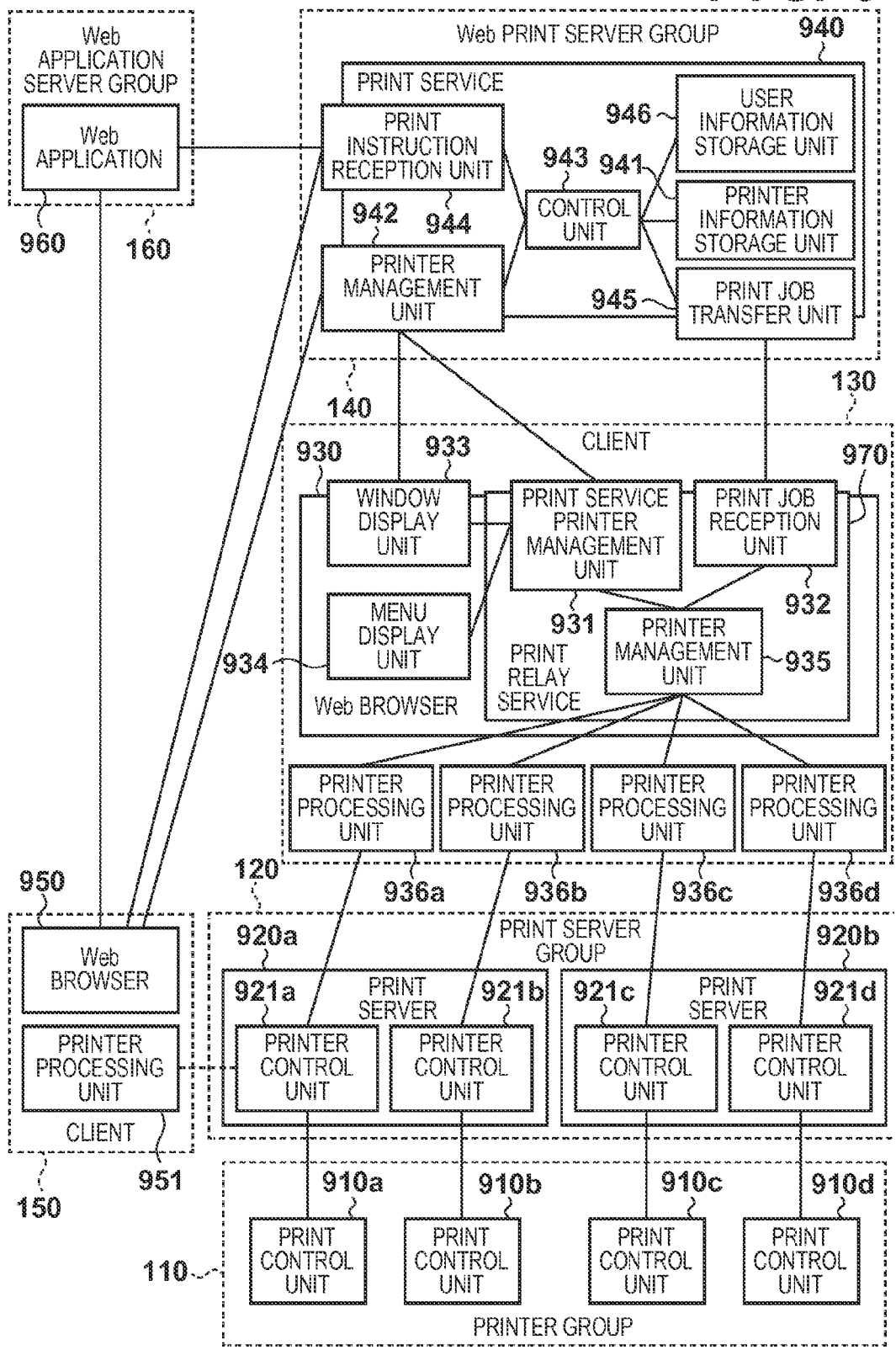

FIG. 11A

| SPID | PRINTER ADMINISTRATOR | PRINTER NAME | PROXY ID | PRINT SERVER | RPID | CAPABILITIES | PRINT SETTING INITIAL VALUE | SHARING USER | SHARING USER STATUS |
|---|---|---|---|---|---|---|---|---|---|
| 5842 | Owner_M | Printer1 | Proxy-S | PrnSrv-X | RP-001 | PrnCaps-1 | PrnTicket-1 | GroupX | - |
| 1506 | Owner_M | Printer2 | Proxy-S | PrnSrv-X | RP-002 | PrnCaps-2 | PrnTicket-2 | GroupX | - |
| 5126 | Owner_M | Printer3 | Proxy-S | PrnSrv-X | RP-003 | PrnCaps-3 | PrnTicket-3 | GroupX | - |

FIG. 11B

| PRINTER NAME | PRINT SERVER | CAPABILITIES | PRINT SETTING INITIAL VALUE |
|---|---|---|---|
| Printer1 | PrnSrv-X | PrnCaps-1 | PrnTicket-1 |

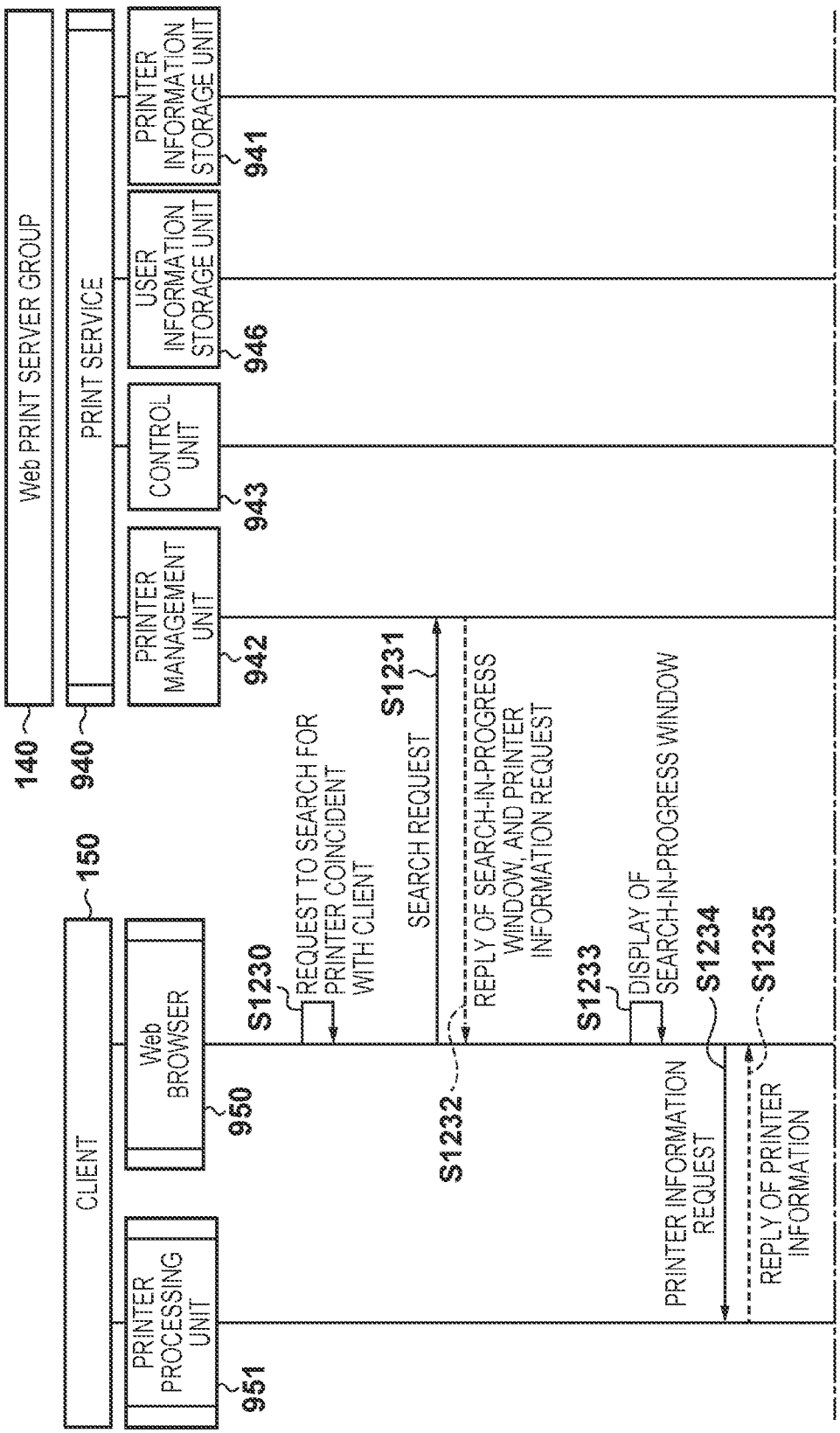

PRINTING SERVER GROUP INCLUDING A PRINT SERVICE OF TRANSFERRING A PRINT JOB TO A PRINTER VIA A NETWORK

BACKGROUND OF THE INVENTION

1. Field of the Invention

The present invention relates to a printing system, control method thereof, and non-transitory computer-readable medium.

2. Description of the Related Art

Conventionally, printing by a shared printer is popularly used in an office environment. The shared printer is a printer driver which is installed in a print server by an administrator and set to be shared. A user can access the print server from a client and select an arbitrary printer from a list of shared printers having the sharing setting in the print server. In response to this, the printer object of this shared printer is installed in the client to enable printing using this shared printer. The management authority of a shared printer in the print server is given to only the administrator, and the user can use the shared printer under the management. A technique regarding a shared printer is disclosed in, for example, Japanese Patent Laid-Open No. 2006-244321.

There is a print service of transferring a print instruction from a client to a server, and converting a content to be to be printed into print data by the server which has received the print instruction. Recently, cloud computing is receiving attention as one form of providing a service from a server to a client. The main feature of cloud computing is to distribute and execute data conversion and data processing by using many computing resources, and simultaneously process requests from many clients. At present, a vendor who provides various print services by installing Web services on a cloud computing environment which implements cloud computing is making an appearance.

For example, Google® has released an interface which allows a printer to perform data communication with a cloud computing environment. By installing this interface in a printer, a user can designate the printer from a client to print even when the printer is connected to a server via the Internet.

When a plurality of users use one service printer from a print service as in an office environment, a sharing function provided by the print service is used. First, one user (printer administrator) registers a service printer in the print service. The printer administrator determines whether to permit another user to use the service printer, and makes "sharing setting" in the print job queue of the service printer for the account of a user permitted to use the service printer. When the user having the sharing setting logs in to the print service, he instructs whether to permit "sharing registration" of service printers having the sharing setting. If "sharing registration" is permitted, sharing registration is performed for all service printers having the sharing setting. The print job queue of the service printer of the printer administrator and the account of the user having the sharing setting (to be simply referred to as a sharing user hereinafter) are linked. As a result, the sharing user can transfer a print job to the print job queue.

The following problems arise when the above-described print service is introduced into an office environment, operated, and used. The first problem is that, when the printer administrator makes the sharing setting of a service printer for a user, work of determining a user account for which the sharing setting of each service printer should be made, and then making the sharing setting is complicated and puts a heavy burden. The second problem is that a user cannot perform sharing registration at an arbitrary timing for only an arbitrary service printer among service printers having the sharing setting.

SUMMARY OF THE INVENTION

According to one aspect of the present invention, there is provided a printing system including a print service of transferring a print job to a printer via a network, comprising: an obtaining unit configured to obtain printer information about a printer, user information about a first user, and server information about a print server which centrally manages a plurality of printers; a storing unit configured to generate, based on the printer information of the printer and the user information, a printer object used when using the printer via the print service, and store the generated printer object in association with the server information of the print server which manages the printer; a providing unit configured to, if the first user selects the print server, provide a setting window for instructing to share, with a second user, a plurality of printers managed by the selected print server; and a changing unit configured to, if sharing is instructed in the setting window, change a state of printer objects of the respective printers to a shared state to allow the second user to use the printer objects of the respective printers managed by the selected print server.

According to another aspect of the present invention, there is provided a method of controlling a printing system including a print service of transferring a print job to a printer via a network, comprising: obtaining printer information about a printer, user information about a first user, and server information about a print server which centrally manages a plurality of printers; generating, based on the printer information of the printer and the user information, a printer object used when using the printer via the print service, and storing the generated printer object in a storage unit in association with the server information of the print server which manages the printer; providing, if the first user selects the print server, a setting window for instructing to share, with a second user, a plurality of printers managed by the selected print server; and changing, if sharing is instructed in the setting window, a state of printer objects of the respective printers to a shared state to allow the second user to use the printer objects of the respective printers managed by the selected print server.

According to another aspect of the present invention, there is provided a non-transitory computer-readable medium storing a program for causing a computer to function as: an obtaining unit configured to obtain printer information about a printer, user information about a first user, and server information about a print server which centrally manages a plurality of printers; a storing unit configured to generate, based on the printer information of the printer and the user information, a printer object used when using the printer via the print service, and store the generated printer object in association with the server information of the print server which manages the printer; a providing unit configured to, if the first user selects the print server, provide a setting window for instructing to share, with a second user, a plurality of printers managed by the selected print server; and a changing unit configured to, if sharing is instructed in the setting window, change a state of printer objects of the respective printers to a shared state to allow the second user to use the printer objects of the respective printers managed by the selected print server.

The present invention improves the convenience of setting by a printer administrator and user for the sharing setting of a printer using a print service.

Further features of the present invention will become apparent from the following description of exemplary embodiments (with reference to the attached drawings).

BRIEF DESCRIPTION OF THE DRAWINGS

FIG. 1 is a view showing the configuration of a content printing system according to the first embodiment;

FIG. 2 is a block diagram showing the hardware arrangement of each apparatus constituting the content printing system according to the first embodiment;

FIG. 3 is a block diagram showing the software arrangement of each apparatus constituting the content printing system according to the first embodiment;

FIG. 5A is a view showing a printer management window UI for a user;

FIGS. 6A, 6B, 6C, 6D, and 6E are tables showing information stored in a printer information storage unit;

FIG. 7A is a view showing capabilities expressed in the XML format;

FIG. 7B is a view showing print setting initial values expressed in the XML format;

FIG. 7C is a view showing a printer registration request expressed in the XML format;

FIG. 7D is a view showing printer information expressed in the XML format;

FIG. 8A is a sequence chart showing processing of registering a service printer in a print service;

FIGS. 8B-1 and 8B-2 are sequence charts showing processing of making the sharing setting for a service printer;

FIGS. 8C-1 and 8C-2 are sequence charts showing processing of performing sharing registration for a service printer;

FIG. 9 is a block diagram showing the software arrangement of each apparatus constituting a content printing system according to the second embodiment;

FIGS. 11A and 11B are tables showing list information of service printers having the sharing setting, and printer information, respectively;

FIGS. 12A-1 and 12A-2 are sequence charts showing processing of displaying a sharing registration window for a service printer; and FIGS. 12B-1 and 12B-2 are sequence charts showing processing of searching for a service printer based on printer information of a client, and performing sharing registration.

DESCRIPTION OF THE EMBODIMENTS

Figure 4A:
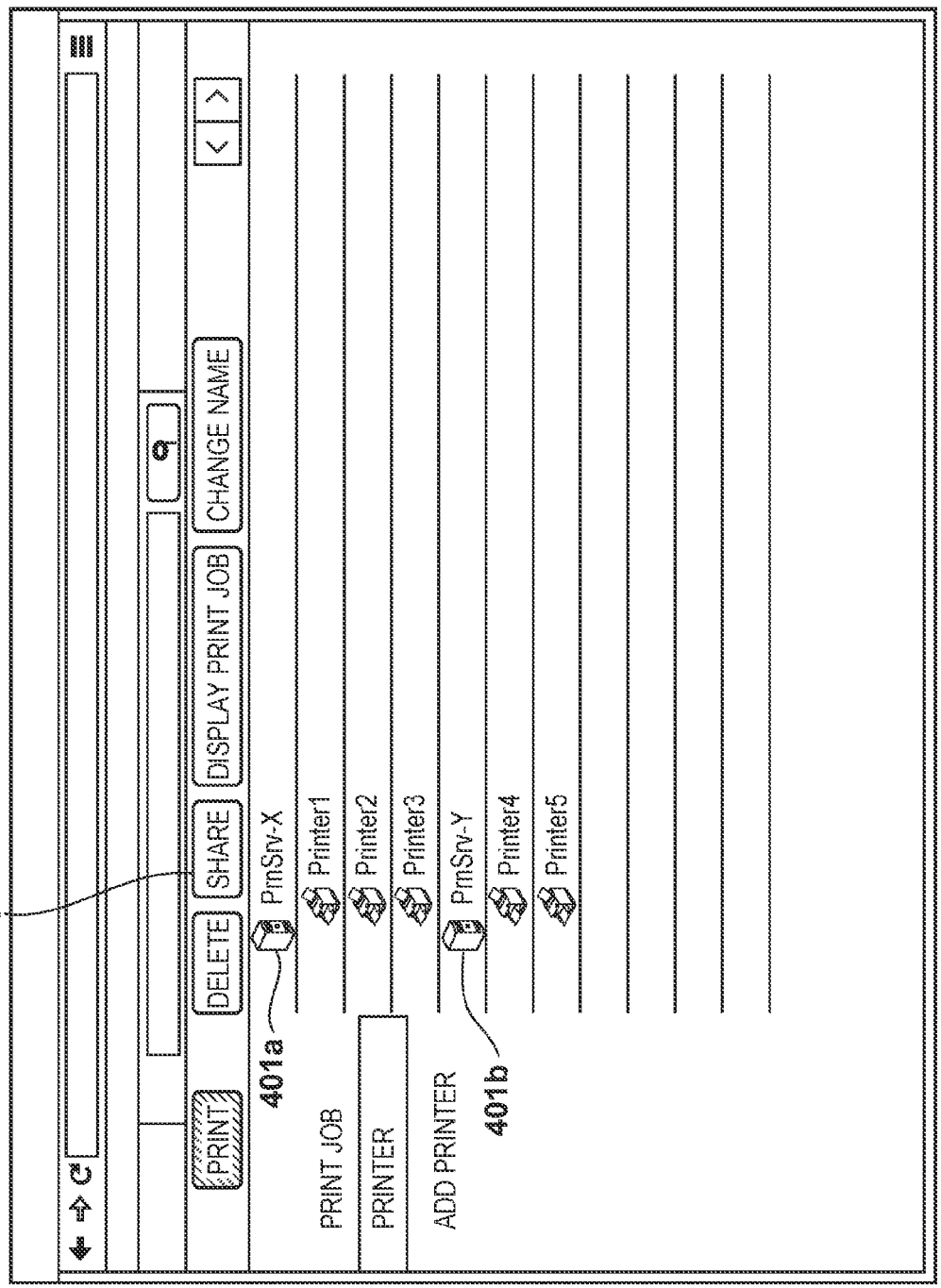
FIG. 4A is a view showing a printer management window UI for a printer administrator.

A print service as the premise of the present invention, and problems will be described in more detail.

(Use of Conventional Print Service)

A flow until a known print service is used will be explained as the premise of the present invention. The print service is a function which is installed in a server or server group to operate a printing application in accordance with an instruction from a client, communicate with a connected printer, and provide print data.

First, a service printer is registered in a print service. The service printer is an instance for selecting a printer, and is associated with an actual printer. The service printer is equivalent to a print queue in a Windows® printing system.

To register a service printer in a print service, the user account of the print service is obtained, and the user account, printer information, and a printer ID (identification information of the service printer in the print service) are linked and registered in the print service. There are roughly two service printer registration methods. One is a method of directly connecting a print service from a print service-compatible printer, and registering a service printer. The other is a method of connecting a print service from a proxy service connectable to a printer, and registering a service printer.

In the method using a proxy service, even a printer which cannot be directly connected to a print service can be registered in the print service via the proxy service. The proxy service is a print relay function installed in an information processing apparatus. More specifically, the proxy server is connectable to a printer, print server, and print service. The proxy server registers a service printer in a print service based on printer information, and transfers, to a corresponding apparatus, print data transferred from the print service. The proxy service is embedded in the Web browser of the information processing apparatus, and registers a service printer in the print service based on information of a print queue in the information processing apparatus.

By this processing, a service printer and print job queue identified by the user account and printer ID are generated in the print service. The user who registered the service printer logs in to the print service from the Web browser of the client by using the user account of the print service. The Web browser then displays the service printer and print job queue linked to the user account.

In printing, the user instructs, to print, the print service via an application corresponding to the print service. In response to this, a list of service printers linked to the user account of the login print service is displayed. When the user selects a service printer from the list, a print job is transferred to the print job queue of the selected service printer. If a printer complying with the selected service printer copes with the print service, the print job is directly transferred from the print service to the printer and printed. If the printer complying with the selected service printer is registered via the proxy service, the print job is transferred to the printer or print server via the proxy service. If the proxy service is embedded in the Web browser, the print job is transferred to a print queue in the information processing apparatus and printed.

(Details of Problems to be Solved by Invention)

Next, details of problems to be solved by the present invention will be explained. The first problem will be explained first. Assume that the above-described print service is installed in a company in which a shared printer is operated by a print server installed at each site in the company. In this case, first, the printer administrator registers, in a print service from the proxy service of the print service, a shared printer registered in the print server in the company. Then, the printer administrator makes the sharing setting of a service printer registered in the print service, for the user account of an intra-company user who is to use the service printer.

The sharing setting is made by selecting an arbitrary service printer and inputting the account of a user (or group) for whom the sharing setting of the service printer is made. At this time, the printer administrator needs to individually determine and set a user (or group) for whom the sharing setting of each service printer should be made. For this purpose, information which associates, for example, each printer with a user (or group) for whom the sharing setting should be made is recorded and managed in another storage device. While referring to this information, the printer administrator determines a user account for which the sharing setting of each service printer should be made, and makes the sharing setting. However, this work is complicated and puts a heavy burden as work to be performed by the printer administrator in a company in which there are many printers and many users. Also, this work has a high risk of causing a setting error. This problem becomes more serious as the number of sites, printers, or users is large.

Next, the second problem will be explained. When the sharing setting of a plurality of service printers is made for a given user in a print service in a given company, the user logs in to the print service and instructs whether to permit sharing registration of these service printers on a printer management window. If the user permits sharing registration, sharing registration is performed for all the service printers having the sharing setting. At this time, the service printers to undergo sharing registration may include a service printer unnecessary for the user. This is because, in a company in which there are many printers and many users, it is considered that the printer administrator makes the sharing setting not for only a printer necessary for each user (or group) but for all service printers which may be used. For example, for a group account belonging to a given site, the sharing setting is made for all printers in this site.

If an unnecessary service printer is included upon sharing registration by the user, it is difficult to find out a service printer serving as an output destination in printing. This problem becomes serious especially when the number of printers in a company or site is enormous and the number of unnecessary service printers having undergone sharing registration is very large.

Further, once the user rejects the sharing setting, the sharing setting is deleted, and he cannot perform sharing registration unless the printer administrator makes the sharing setting for a service printer. This resetting work puts a heavy work burden on both the printer administrator and user, and increases the risk of causing a setting error.

<First Embodiment>

The first embodiment of the present invention will be described below with reference to the accompanying drawings.

[System Configuration]

Figures 1, 12A:
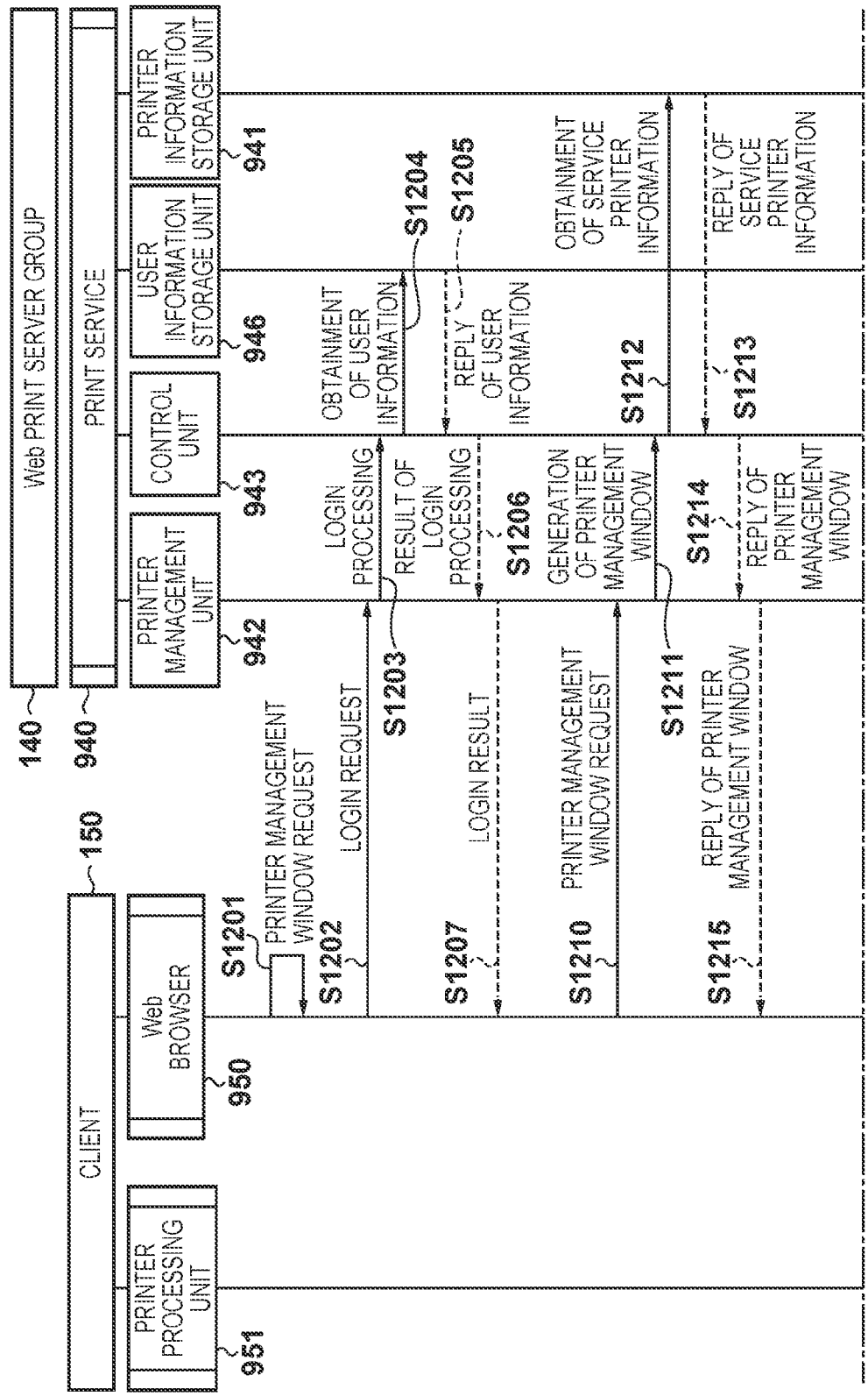

First, the configuration of a printing system 1000 in the first embodiment will be explained. FIG. 1 is a view showing an example of the configuration of the printing system 1000. The printing system 1000 includes a client 130, client 150, print server group 120, and printer group 110. The client 130, client 150, print server group 120, and printer group 110 are apparatuses arranged in a user environment, and are connected to each other via a network 100. The network 100 is connected to the Internet 101. The printer group 110 is connected to be communicable with the print server group 120.

Further, the printing system 1000 includes a Web application server group 160 and Web print server group 140. The Web application server group 160 and Web print server group 140 are sometimes server groups provided by the same vendor. In this case, these two server groups may be connected via the network 100. The respective apparatuses and respective server groups constituting the printing system 1000 are connectable via the Internet 101 and can perform data communication with each other. Note that a plurality of clients 130 and a plurality of clients 150 may be arranged. Each of the print server group 120, printer group 110, Web application server group 160, and Web print server group 140 is constructed by a plurality of apparatuses, but may be constructed by one apparatus. Further, the printer group 110 may be connected to be communicable with only the print server group 120.

[Hardware Arrangement]

Figures 2, 12A:
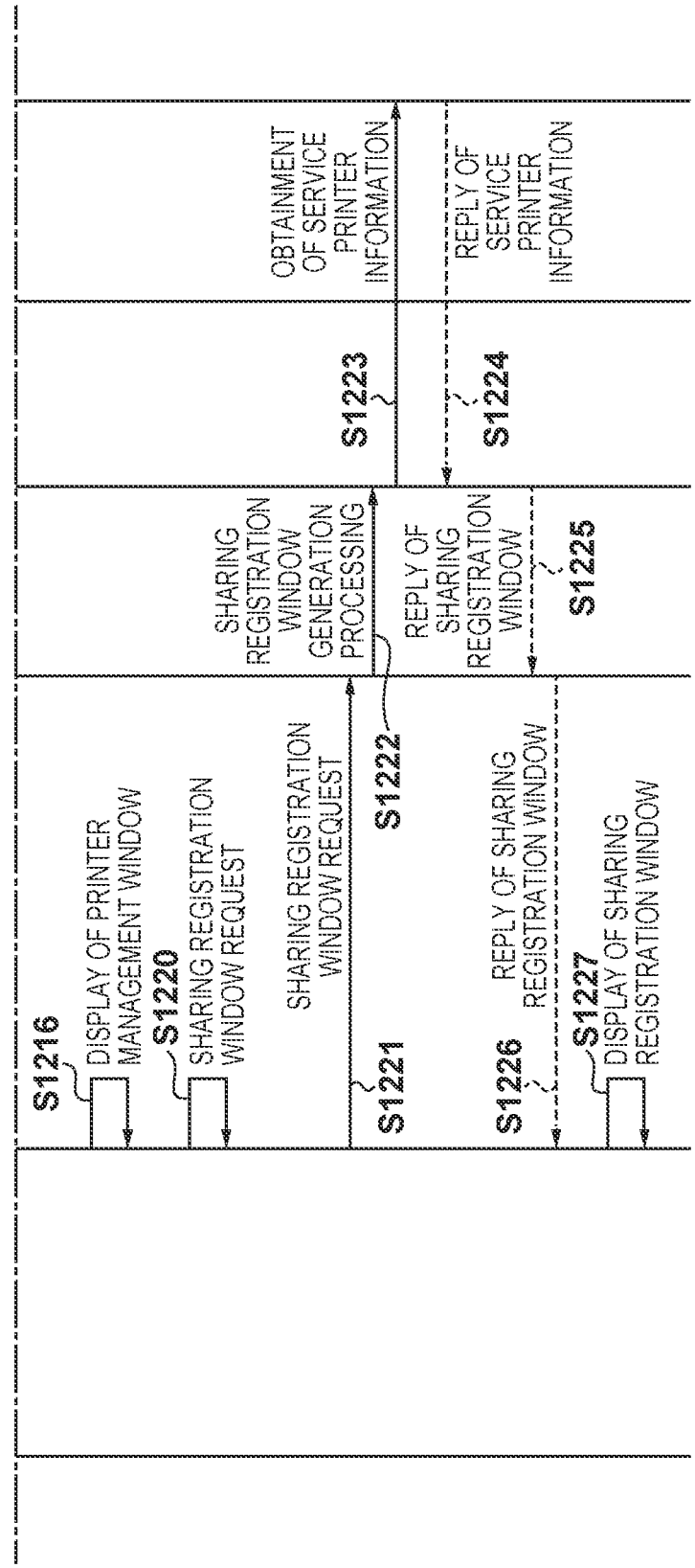
Figures 2, 12B:
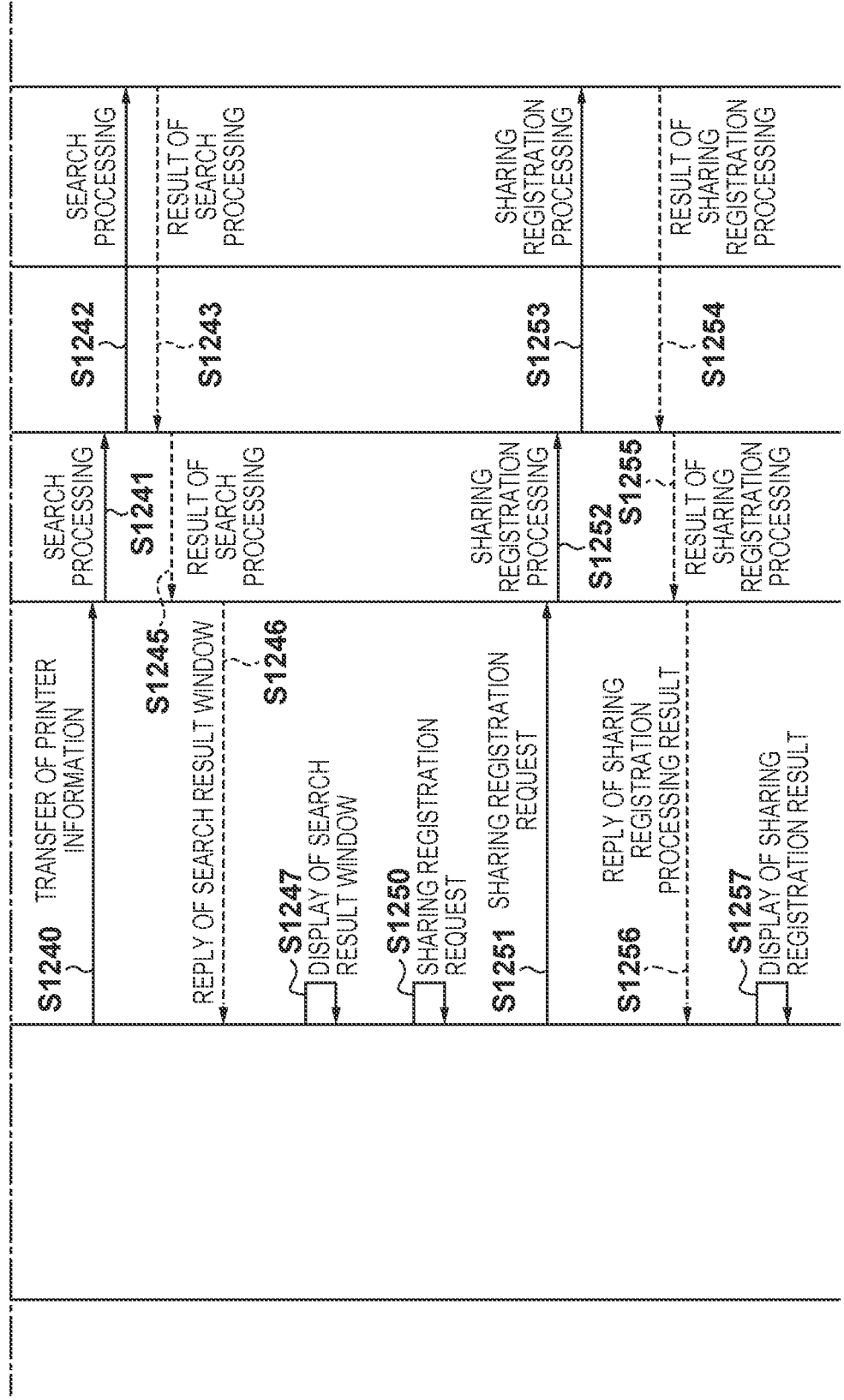

Next, an example of the hardware arrangement of the respective apparatuses and respective servers constituting the printing system 1000 will be explained. FIG. 2 is a block diagram showing an example of the hardware arrangement of the respective clients and respective server groups constituting the printing system 1000. An information processing apparatus 201 is a server apparatus which constitutes each of the respective apparatuses and respective server groups constituting the printing system 1000. In the embodiment, the respective clients and respective server apparatuses constituting the respective server groups will be explained as information processing apparatuses having the same arrangement. A CPU (Central Processing Unit) 202 is a unit which executes various programs and implements various functions. A ROM (Read Only Memory) 203 is a unit which stores various programs. A RAM (Random Access Memory) 204 is a temporary storage area and functions as a storage unit. The CPU 202 loads, to the RAM 204, a program stored in the ROM 203 and executes it. The RAM 204 is a unit also used as the temporary work storage area of the CPU 202.

An Input/Output interface 205 is an interface unit which transfers data to a connected display (not shown), and receives data from a pointing device (not shown). A NIC (Network Interface Card) 206 is a unit for connecting, to the network 100, the information processing apparatus 201 serving as each of the respective apparatuses and respective server groups constituting the printing system 1000. The above-described units can transfer/receive data via a bus 207.

In addition to the arrangement shown in FIG. 2, a printing unit (not shown) is mounted in an image forming apparatus constituting the printer group 110. The printing unit can transfer/receive data to/from each unit via the bus 207. Note that the printing unit is a unit capable of printing a raster image on a printing medium. The printing unit performs various image forming operations in accordance with instructions from the CPU 202. The image forming apparatus constituting the printer group 110 is constructed by, for example, a printer or MFP (Multi-Function Peripheral).

[Software Arrangement]

Next, an example of the software arrangements of the respective apparatuses and respective server groups constituting the printing system 1000 will be explained. FIG. 3 shows an example of the software arrangements of the respective apparatuses and respective server groups constituting the printing system 1000 according to the embodiment. Programs which implement the functions of the respective software arrangements shown in FIG. 3 are stored in the ROMs 203 of the respective apparatuses and respective server groups. The CPUs 202 load the programs to the RAMs 204 and execute them, thereby implementing these functions.

In the Web print server group 140, a plurality of servers are virtualized and regarded as one server, and this server implements the function of a print service 340. In the Web print server group 140, a plurality of virtual machines run in one server, and each virtual machine implements the function of the print service 340. The print service 340 shown in FIG. 3 represents one of these virtual machines.

The client 130 includes a Web browser 330, and printer processing units 336a, 336b, 336c, and 336d. A print relay service 370 is embedded in the Web browser 330. The print relay service 370 can communicate with the print service 340, and performs registration of a service printer and reception of a print job. The printer processing units 336a, 336b, 336c, and 336d exist in correspondence with printer control units 321a, 321b, 321c, and 321d in print servers 320a and 320b, respectively. The printer processing units 336a to 336d hold pieces of printer information (for example, printer names, capabilities, and print setting default values) of the printer control units 321a to 321d, respectively. The printer processing units 336a to 336d transfer print jobs to the corresponding printer control units 321a to 321d, respectively.

Although the print relay service 370 is embedded in the Web browser 330, the arrangement is not limited to this. For example, the print relay service 370 may be implemented as a program different from the Web browser 330 running on the client 130. Alternatively, the print relay service 370 may be implemented as a program running on the print server group 120. For descriptive convenience, one of the printer processing units 336a to 336d will be called the printer processing unit 336.

The print server group 120 includes the print servers 320a and 320b. The print server 320a includes the printer control units 321a and 321b, and the print server 320b includes the printer control units 321c and 321d. The printer control units 321a to 321d exist in correspondence with print control units 310a, 310b, 310c, and 310d in the printer group 110, respectively. The printer control units 321a to 321d hold pieces of printer information (for example, printer names, capabilities, and print setting default values) of the print control units 310a to 310d, respectively. The printer control units 321a to 321d transfer print jobs to the corresponding print control units 310a to 310d, respectively.

The embodiment assumes that the print server 320a and the print control units 310a and 310b are arranged in the same area and security domain, the print server 320b and the print control units 310c and 310d are arranged in the same area and security domain, and they are centrally managed. Although the printer control units 321a to 321d exist in correspondence with the print control units 310a to 310d, respectively, five or more printer control units 321 or one printer control unit 321 may exist. Although the printer group 110 includes the four print control units 310a to 310d, five or more print control units 310 or one print control unit 310 may exist. For descriptive convenience, one of the printer control units 321a to 321d will be called the printer control unit 321. Also, for descriptive convenience, one of the print control units 310a to 310d in the printer group 110 will be called the print control unit 310.

[Description of Various Functions]

(Function of Print Service)

First, the function of the print service 340 in the Web print server group 140 will be explained.

The print service 340 includes a printer information storage unit 341, printer management unit 342, control unit 343, print instruction reception unit 344, print job transfer unit 345, and user information storage unit 346. The printer management unit 342, print instruction reception unit 344, and print job transfer unit 345 include communication modules (not shown), and can perform data communication with the communication module of the Web browser 330 and that of a Web browser 350.

Upon receiving a service printer registration request from the print relay service 370 or print control unit 310, the printer management unit 342 registers a service printer. The service printer is uniquely generated for each requested printer or print relay service and for each user account. For this reason, if a different user or different print relay service registers a service printer even for the same actual printer, a different service printer is generated. In this specification, the service printer will also be referred to as a printer object.

The embodiment assumes that the print relay service 370 in the Web browser 330 issues a service printer registration request to the printer management unit 342. The service printer registration request is issued by transferring printer registration information from the print relay service 370 to the printer management unit 342. When transferring printer registration information, it is necessary to log in to the print service 340. A service printer is linked to the login user account and registered.

The print service 340 issues and manages a user account and password. The printer registration information includes a printer name, proxy ID, print server information, capabilities, print setting initial values, and status. FIG. 7C shows an example of printer registration information to be transferred to the print service 340. FIG. 7C shows information of one printer, but information of a plurality of printers may be transferred at once.

A user who registered a service printer serves as the administrator of the service printer (to be simply referred to as a printer administrator (first user) hereinafter). The printer administrator is given a management authority to rewrite or delete information of the service printer.

The user information storage unit 346 stores information of a user account and password, or group account registered in the print service 340. FIG. 6A shows user account information stored in the user information storage unit 346. The user account information includes a user account 601 and password 602.

FIG. 6B shows group account information stored in the user information storage unit 346. The group account information includes a group account 610 and a user account 611 linked to each group account. In the example shown in FIG. 6B, user accounts "UserA" and "UserB" are linked to a group account "GroupX" and registered. Also, user accounts "UserC", "UserD", and "UserE" are linked to a group account "GroupY" and registered.

However, the arrangement is not limited to those shown in FIGS. 6A and 6B. For example, six or more user accounts or one user account may be registered. Two or more group accounts may be registered, or no group account may be registered. The purpose of the group account is to efficiently perform user management. Thus, the group account is generally prepared and registered for each section or site to which the user belongs.

In a conceivable form, a mechanism for synchronizing an intra-company user account and a user account on the print service 340 is provided in the print service 340. In this case, the printer administrator makes, in the print service 340, synchronous setting of the intra-company user account and the user account on the print service 340 that is to be linked to the intra-company user account. Accordingly, the setting of the intra-company user account and the setting of the user account of the print service 340 can be synchronized to unify the user account.

The printer information storage unit 341 stores information of a service printer registered in the print service 340. The printer information storage unit 341 stores an SPID (Service Printer ID), the user account of a printer administrator, a printer name, a proxy ID, print server information, RPID (Real Printer ID), capabilities, print setting initial values, the user account (or group account) of a sharing user, and the status of the sharing user. FIG. 6C shows service printer information stored in the printer information storage unit 341. The service printer information includes an SPID 620, a user account 621 of a printer administrator, a printer name 622, a proxy ID 623, print server information 624, RPID 625, capabilities 626, print setting initial value 627, sharing user information 628, and sharing user status information 629.

The SPID is an identifier issued by the print service 340 in registering a service printer. The print service 340 uniquely identifies each service printer by using the SPID. The user account of the printer administrator is the user account of a user who registered the service printer. The printer name is a name assigned to the print control unit 310, and is used to refer to the print control unit 310. Note that the printer name may be the same between a plurality of service printers, unlike identification information.

The proxy ID is an identifier for uniquely identifying, by the print service 340, an interface (in the embodiment, the print relay service 370) which registered a service printer. The proxy ID is managed so that the correspondence between a service printer and an interface from which the service printer was registered can be determined when service printers are registered from interfaces having different proxy IDs.

The print server information is information capable of uniquely identifying the print server 320 which controls a printer. For example, a host name and IP address capable of uniquely specifying a print server on a network are stored. This information is stored when a printer to be registered is a shared printer (in the embodiment, the printer control unit 321) which is registered in the print server 320 and shared. For example, the print server information is used to identify a print server linked to each printer.

The RPID is unique identification information assigned to each printer. When a printer is registered from the print relay service, the RPID is information capable of identifying the printer in the print relay service.

The capabilities include information about, for example, whether the print control unit 310 is capable of 2-side printing, whether it is capable of color printing, or an outputtable paper size. The capabilities can be expressed in, for example, the XML format, as shown in FIG. 7A. In FIG. 7A, Item tags represent the abilities of the print control unit 310, and indicate that the print control unit 310 is capable of 2-side printing, capable of color output, and can output sheets of B5, A4, and A3 sizes.

The print setting initial values are the initial values of print settings. The print setting initial values can be expressed in, for example, the XML format, as shown in FIG. 7B. The print setting initial values are a subset of the capabilities shown in FIG. 7A. For each function, the value of any one Item tag among the values defined in FIG. 7A is selected. In the example of FIG. 7B, the print setting initial values represent that 1-side output, color output, and A4 size are set.

The user account of the sharing user is a user account (or group account) for which the sharing setting of a service printer is made. When the printer administrator makes the sharing setting of a registered service printer for another reliable user account (or group account), the account of the user (or group) having the sharing setting is linked to the service printer.

The sharing user status is information representing whether a user (to be simply referred to as a sharing user (second user) hereinafter) for whom the printer administrator makes the sharing setting of a service printer has performed sharing registration for the service printer. The sharing registration indicates a state in which a service printer having the sharing setting is displayed in a list of service printers on the printer management window of the print service 340 and a print job can be transferred to the service printer.

The sharing user can display a list of service printers having the sharing setting, and instruct sharing registration of an arbitrary service printer on the printer management window displayed when he logs in to the print service 340 by using the Web browser 350. When sharing registration is instructed, the sharing user status is validated. After that, when the sharing user displays the printer management window of the print service 340 from the Web browser 350, the service printer having undergone sharing registration is displayed in the printer list so that it can be selected. Then, the sharing user can transfer a print job to the service printer.

Upon receiving a request from the Web browser 330 or 350 to obtain a list of service printers linked to a user account, the printer management unit 342 generates a list of service printers linked to the user account and transfers it. The service printer list includes even a service printer having undergone sharing registration. The service printer list is generated by specifying an SPID and printer name stored in the printer information storage unit 341 via the control unit 343 based on the user account.

Upon receiving a printer management window obtaining request from the Web browser 330 or 350, the printer management unit 342 generates a printer management window based on a list of service printers linked to a user account, and transfers it to the Web browser 330 or 350. The service printer list includes even a service printer having undergone sharing registration. When service printers hold print server information (the print server information 624 in FIG. 6C), it is also possible to classify and display the service printers for respective print servers.

FIG. 4A shows an example of a printer management window in which service printers are classified and displayed for respective print servers. Items 401*a* and 401*b* display print servers classified based on print server information (the print server information 624 in FIG. 6C) stored in the printer information storage unit 341. In FIG. 4A, service printers each having print server information are linked to respective print servers and displayed.

The user can confirm the printer name of each service printer, the status of a print job, and the like through the printer management window displayed on the Web browser 350. For a service printer for which the user is a printer administrator, the user is given a management authority to instruct to change or delete a setting or make the sharing setting.

Details of a function of making "sharing setting" for a service printer registered in the print service 340 will be described.

Figure 4B:
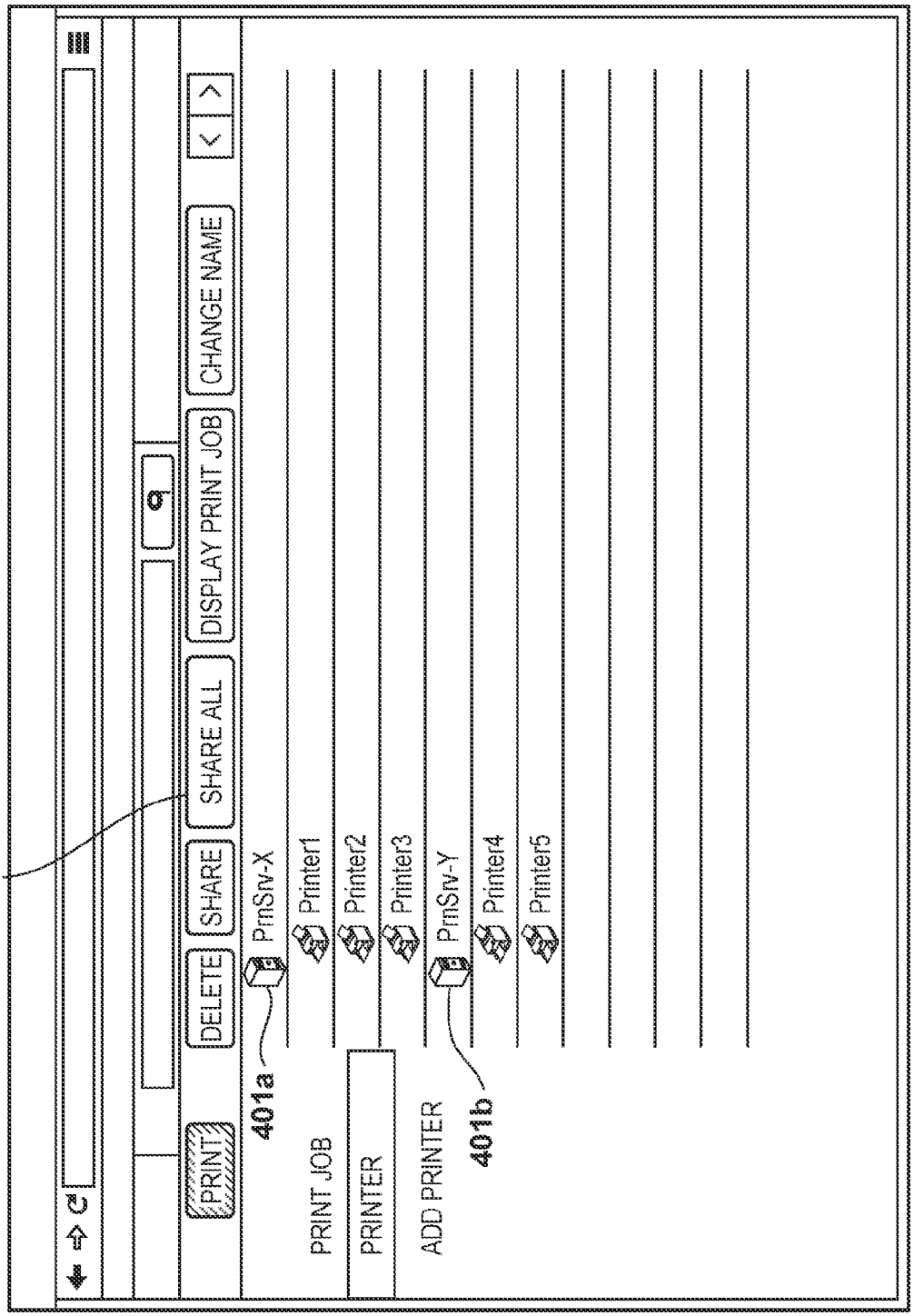
FIG. 4B is a view showing a printer management window UI for the printer administrator.

First, the printer management unit 342 receives a service printer sharing setting window request from the Web browser 330 through a printer management window as shown in FIG. 4A. FIGS. 4A and 4B show examples of a printer management window for receiving a sharing setting window request.

The printer management window in FIG. 4A will be explained first. The items 401a and 401b display print servers classified based on print server information (the print server information 624 in FIG. 6C) stored in the printer information storage unit 341. A button 402 is used to request a sharing setting window. When the button 402 is pressed while a service printer or print server is selected, a sharing setting window for a list of service printers linked to the selected service printer or print server is requested.

For example, when a print server displayed in the item 401a is selected and the button 402 is pressed, service printers linked to the print server corresponding to the item 401a are specified based on information in the printer information storage unit 341. Referring to FIG. 6C, service printers (SPID="5842", "1506", "5126") having information "PrnSrv-X" corresponding to the item 401a in the print server information 624 are specified. Then, a sharing setting window for the specified service printers is requested. Only the printer administrator having the management authority can request the sharing setting window. That is, only the printer administrator of service printers or a print server selected in the item 401a or 401b can press the button 402.

Subsequently, a printer management window in FIG. 4B will be explained. Print servers are displayed in items 410a and 410b, and service printers are linked to the print servers and displayed. Also, a button 411 is displayed to make sharing setting for service printers at once. When the button 411 is pressed, a sharing setting window to make the sharing setting for service printers at once is requested.

Upon receiving the sharing setting window request in the printer management window, the printer management unit 342 generates a service printer sharing setting window and transfers it to the Web browser 330.

Figure 4C:
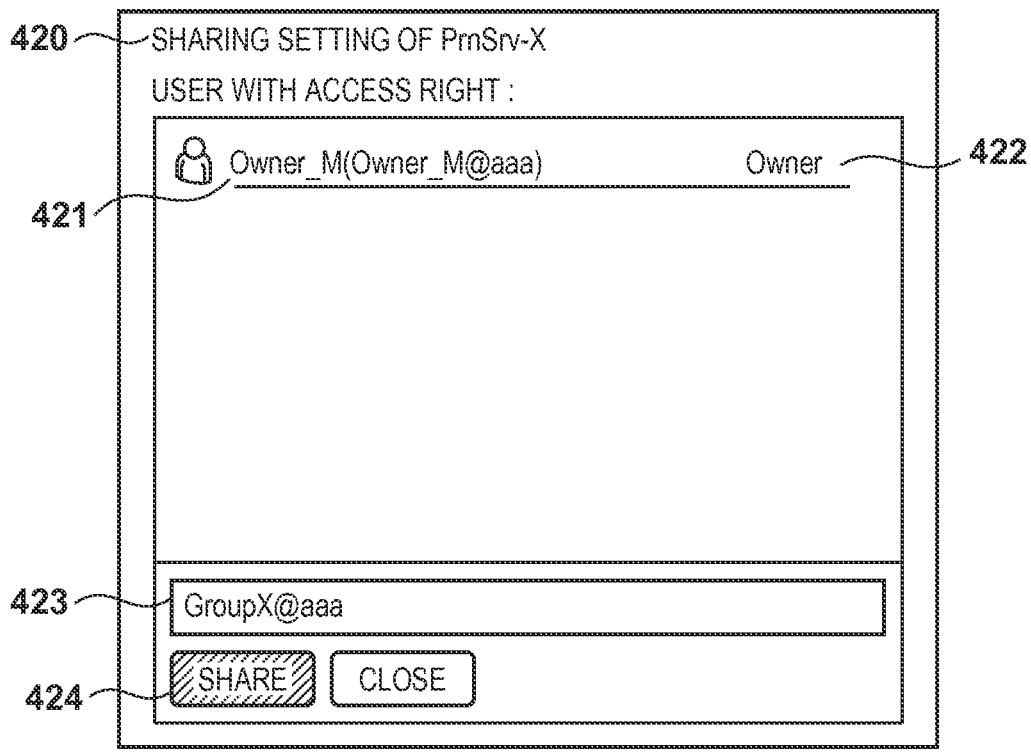
FIG. 4C is a view showing a sharing setting window UI for a print server.
Figure 4D:
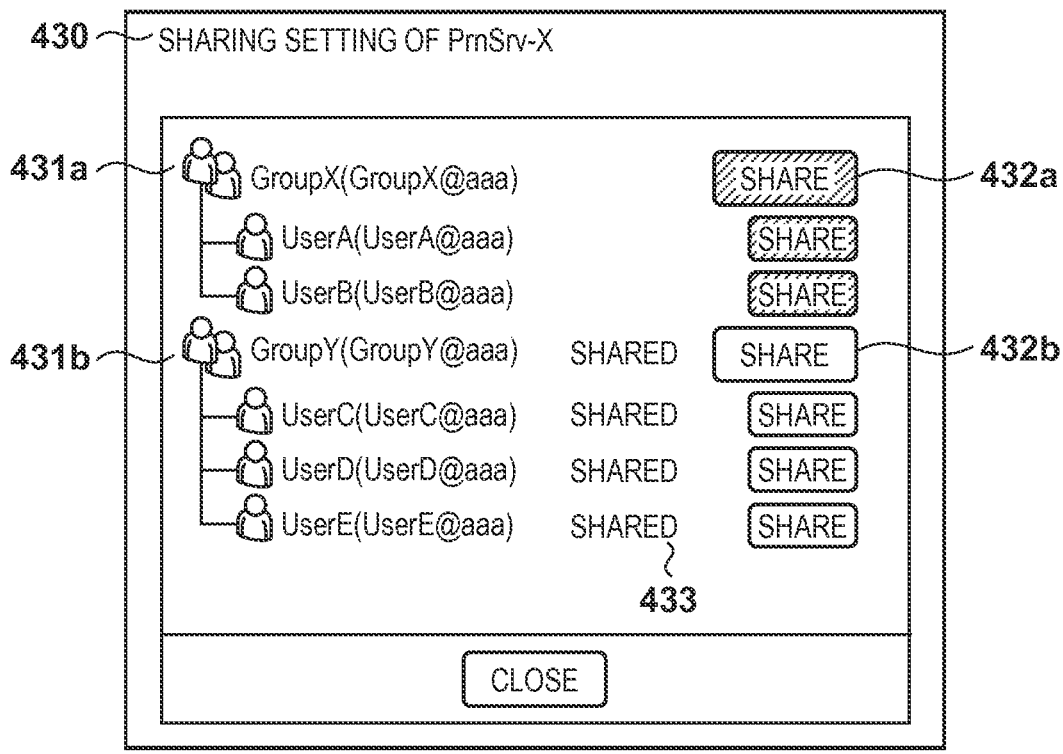
FIG. 4D is a view showing a sharing setting window UI for the print server.
Figure 4E:
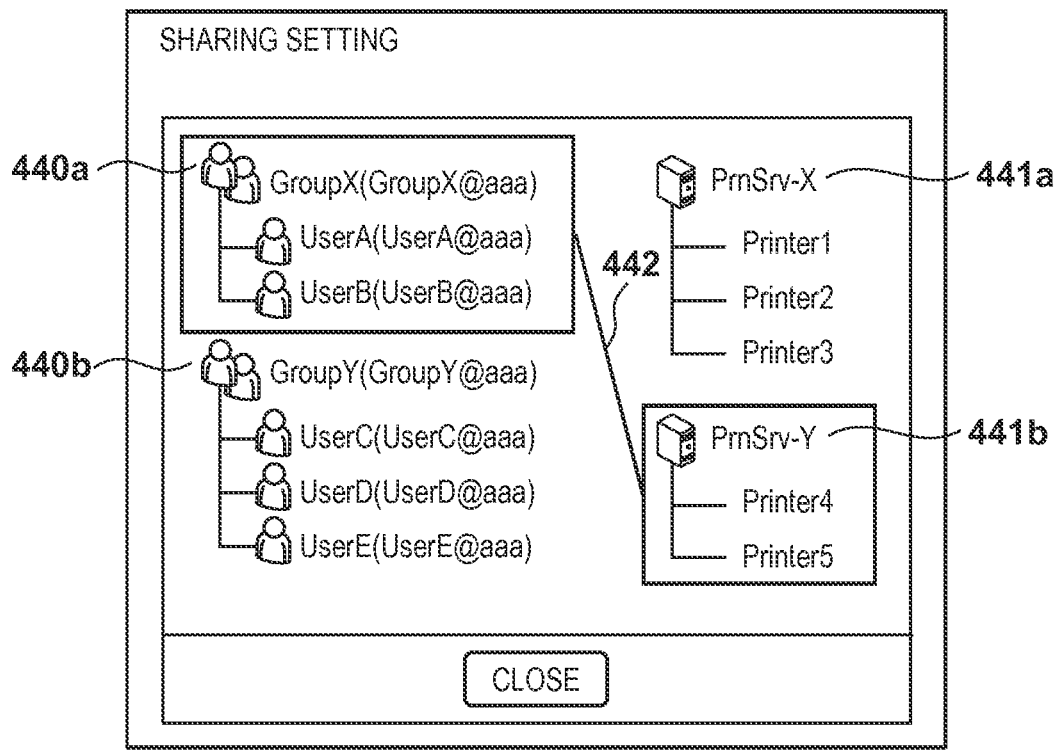
FIG. 4E is a view showing a sharing setting window UI for the print server.
Figure 4F:
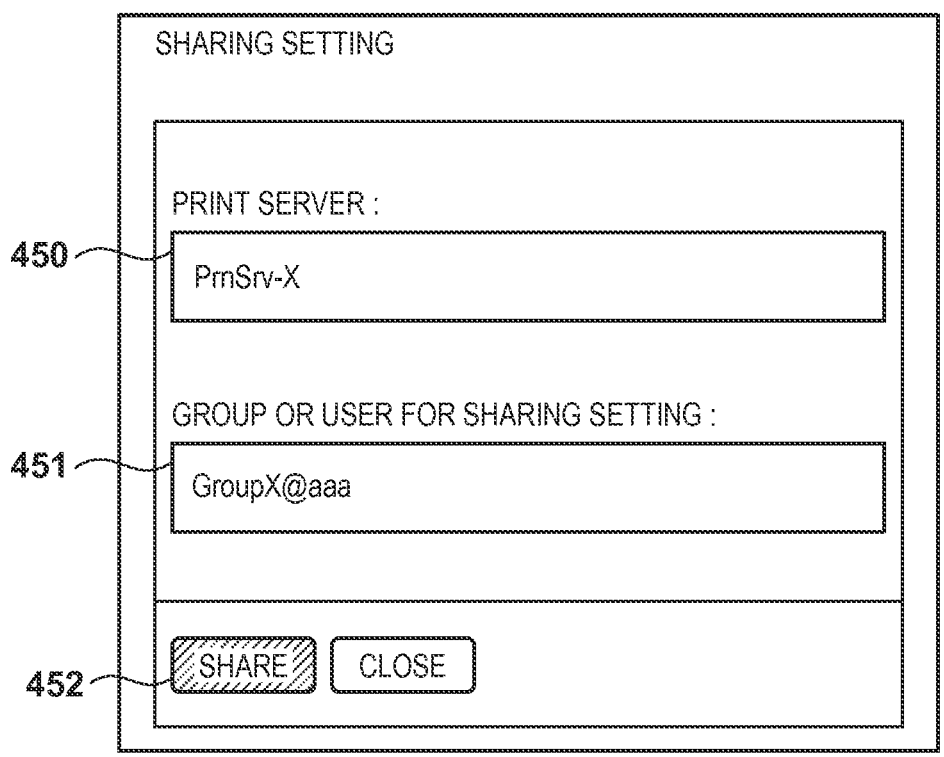
FIG. 4F is a view showing a sharing setting window UI for the print server.

FIGS. 4C to 4F show four examples of a sharing setting window generated by the printer management unit 342. FIGS. 4C and 4D show examples of a window generated when a sharing setting request is received in the printer management window of FIG. 4A. FIGS. 4E and 4F show examples of a window generated when a sharing setting request is received in the printer management window of FIG. 4B.

First, a sharing setting window shown in FIG. 4C will be explained. An item 420 is information of a print server selected in the printer management window of FIG. 4A, and represents the sharing setting for service printers linked to the print server. An item 421 displays the account of a user (or group) having the access right to the service printers linked to the print server for which the sharing setting is made. In this example, a printer administrator "Owner_M" who registered service printers linked to a print server "PrnSrv-X" is displayed. An authority 422 is the management authority of the user (or group) having the access right. The management authority is displayed to be able to distinguish it. For example, "Owner" is displayed for a printer administrator, and "Share" is displayed for a sharing user. Although not shown, a button for canceling the sharing setting is also displayed for a sharing user.

In an area 423, the account of a user (or group) for whom the sharing setting of service printers linked to a print server is made is input. A button 424 is used to instruct execution of the sharing setting. When the button 424 is pressed, the sharing setting of the account of the user (or group) input in the area 423 is executed for service printers linked to a selected print server.

Subsequently, a sharing setting window shown in FIG. 4D will be explained. An item 430 is information of a print server selected in the printer management window of FIG. 4A, and represents the sharing setting of service printers linked to the print server. Items 431a and 431b display group accounts stored in the user information storage unit 346, and user accounts linked to them. Buttons 432a and 432b are used to instruct execution of the sharing setting of each user or group account.

In this example, the button (button 432a) for a user or group account for which the sharing setting is not made is displayed so that it can be pressed. To the contrary, the button (button 432b) for a user or group account for which the sharing setting has already been made is grayed out. If this button is pressed, the sharing setting of service printers linked to a selected print server is executed for the user account or group account. An item 433 displays the status of the sharing setting. In this example, "shared" is displayed for a user or group account for which the sharing setting has already been made.

Next, a sharing setting window shown in FIG. 4E will be explained. Items 440a and 440b display group accounts stored in the user information storage unit 346, and user accounts linked to them. Items 441a and 441b display information of print servers stored in the printer information storage unit 341, and information of service printers linked to them. In this example, a print server or service printers (item 441a or 441b) are selected while a group account or user account (item 440a or 440b) is selected. In response to this, the sharing setting of the selected group account or user account is executed for the selected print server or service printers. For example, when a mouse operation is performed, the mouse is dragged while the mouse cursor exists on the group account (item 440a). Then, the mouse cursor is moved to the print server (item 441a), and the mouse is dropped there to execute the sharing setting of the group account for service printers linked to the print server.

A display 442 displays a group account or user accounts, and the state of the sharing setting of a print server or service printers. Only the printer administrator having the management authority can make the sharing setting of a service printer. Thus, the items 441a and 441b display only a print server or service printers for which the login user has the management authority.

Subsequently, a sharing setting window shown in FIG. 4F will be explained. In an area 450, information for specifying a print server for which the sharing setting is made is input. In an area 451, a group account or account for which the sharing setting is made is input. A button 452 is used to instruct execution of the sharing setting. When the button 452 is pressed, service printers linked to a print server input in the area 450 are specified based on information in the printer information storage unit 341. Then, the sharing setting of the group account or user account input in the area 451 is executed for the specified service printers. Pieces of information for specifying a print server may be input to the area 450. Also, a plurality of group accounts or user accounts may be input to the area 451.

Since the sharing setting work can be performed for each print server, the administrator can easily make the sharing setting of a necessary service printer for a necessary group or user account.

In the embodiment, when a print server is designated, the sharing setting of service printers linked to the print server is made. However, the form is not limited to this. For example, there is also conceivable a form in which when ability information of a service printer is designated, the sharing setting of a list of service printers having this ability information is made. The ability information of a service printer is information of capabilities stored in the printer information storage unit 341. Service printers having the designated ability information are specified based on information in the printer information storage unit 341, and the sharing setting of these service printers is made.

When the sharing setting of service printers is executed in the sharing setting window, a user account or group account having the sharing setting is linked as a sharing user to the service printers. FIG. 6D shows an example of service printer information stored in the printer information storage unit 341 when the sharing setting of the group account "GroupX" is made for the print server "PrnSrv-X". Information of the group account having the sharing setting is stored in the sharing user information 628. At this time, however, service printers having the sharing setting have not been included yet in a printer list displayed on the printer management window of the print service 340 of the sharing user. The sharing user cannot transfer a print job to the service printer having the sharing setting. To transfer a print job, the sharing user needs to perform the following "sharing registration" procedures.

Details of a function of performing "sharing registration" for service printers having the sharing setting in the print service 340 will be described.

First, the printer management unit 342 receives a service printer sharing registration window request from the Web browser 350 through the aforementioned printer management window.

FIG. 5A shows an example of the printer management window which receives a sharing registration window request. An item 501 displays a list of service printers usable by a login user. This list does not include a service printer only having the sharing setting. When the sharing registration is performed for a service printer having the sharing setting, the service printer is displayed in the item 501. A button 502 is used to instruct display of procedures to register a service printer from the print relay service 370 or print control unit 310. Registration of a service printer in the embodiment is performed according to the displayed procedures. A button 503 is used to instruct a sharing registration window request for a service printer having the sharing setting. When the button 503 is pressed, a service printer sharing registration window is requested of the print service 340.

Upon receiving the service printer sharing registration window request from the Web browser 350, the printer management unit 342 generates, based on information in the printer information storage unit 341, a sharing registration window including a list of service printers having the sharing setting. The printer management unit 342 transfers the generated sharing registration window to the Web browser 350. In the example of FIG. 6D, for a user belonging to the group account "GroupX", service printers (SPID="5842", "1506", "5126") for which "GroupX" is stored in the sharing user information 628 are generated as a list.

Figure 5B:
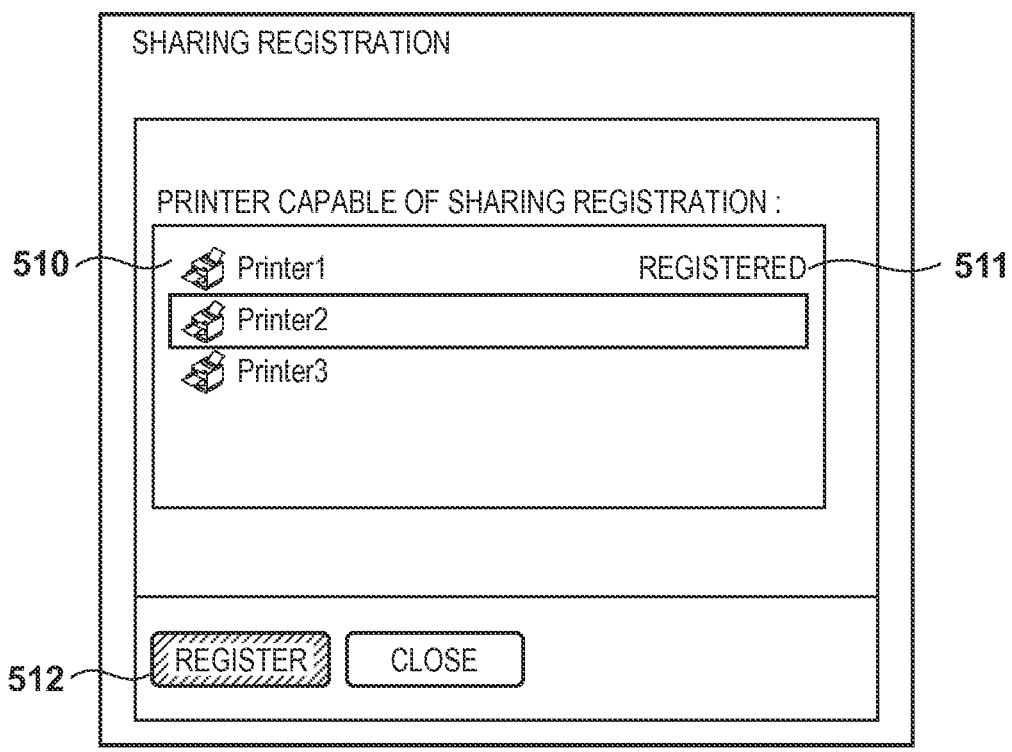
FIG. 5B is a view showing a sharing registration window UI for a service printer.
Figure 5C:
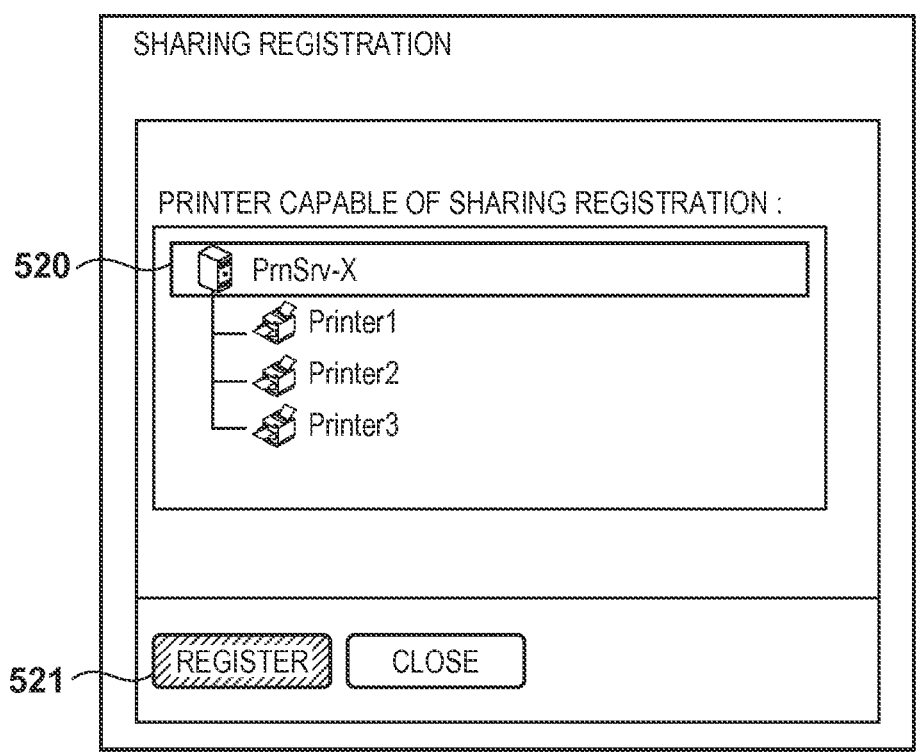
FIG. 5C is a view showing a sharing registration window UI for the service printer.

FIGS. 5B and 5C show examples of a sharing registration window. The sharing registration window is arbitrarily presented using either window arrangement. First, a sharing registration window shown in FIG. 5B will be explained. A list 510 displays a list of service printers having the sharing setting. An item 511 displays information capable of identifying whether sharing registration has been performed for a service printer. A button 512 is used to instruct execution of sharing registration. When the button 512 is pressed while a service printer to undergo sharing registration is selected in the list 510, sharing registration of the selected service printer is executed. There is also conceivable a form in which a service printer having undergone sharing registration is not displayed in the list 510.

Next, a sharing registration window shown in FIG. 5C will be explained. In an item 520, service printers having the sharing setting are linked to print server information and displayed. A button 521 is used to instruct execution of sharing registration. When the button 521 is pressed while a service printer is selected in the item 520, sharing registration of the selected service printer is executed. When a print server is selected in the item 520, sharing registration is executed for a list of service printers linked to the print server.

When sharing registration of a service printer is executed in the sharing registration window, a user account having the sharing setting for the service printer is validated. Then, the sharing user can transfer a print job to the service printer.

FIG. 6E shows an example of service printer information stored in the printer information storage unit 341 after sharing registration. A user "UserA" performs sharing registration of a service printer having SPID="1506" among service printers having the sharing setting. As a result, information "UserA:Share" representing that sharing registration has been performed is stored in the sharing user status information 629. Thereafter, when the sharing user displays the printer management window of the print service 340 from the Web browser 350, the service printer having undergone sharing registration is included in the printer list and displayed in accordance with the sharing user status information 629. The sharing user can therefore select the service printer having undergone sharing registration and input a print job to it. In this manner, the sharing user can perform sharing registration for only an arbitrary service printer at an arbitrary timing. Note that the sharing user does not have the management authority, and thus cannot instruct to change or delete a setting or make the sharing setting for a service printer having the sharing setting.

Upon receiving a print setting window request from the Web browser 350, the printer management unit 342 requests the control unit 343 to generate a print setting window (not shown). The print setting window request includes the SPID of a printer selected by the user in a printer list in printing. The control unit 343 specifies capabilities stored in the printer information storage unit 341 based on the received SPID, and generates a print setting window from the information of the specified capabilities. The print setting window displays only print settings described in the capabilities. The control unit 343 sends back the generated print setting window to the printer management unit 342. The printer management unit 342 transfers the print setting window to the Web browser 350. The printer management unit 342 specifies print setting initial values stored in the printer information storage unit 341 based on the received SPID, and uses them as the initial values of the settings.

Then, the print instruction reception unit 344 receives the print settings input via the print setting window, and the SPID from the Web browser 350. When the Web browser 350 accesses the print instruction reception unit 344 based on a redirect instruction, the print instruction reception unit 344 receives content identification information for identifying a content, printing of which is designated by the user. Based on the received content identification information, the print instruction reception unit 344 obtains the content to be printed from a Web application 360. Also, the print instruction reception unit 344 receives print settings input by the user, and an SPID corresponding to a printer selected by the user. If necessary, the print instruction reception unit 344 converts the content into print data based on the content and print settings obtained from the Web application 360.

The print job transfer unit 345 obtains print data, print settings, and an SPID from the print instruction reception unit 344 via the control unit 343, and generates a print job in the print job queue of a service printer corresponding to the SPID based on them. The print job transfer unit 345 then transfers, to the print job reception unit (in the embodiment, a print job reception unit 332 in the print relay service 370 specified by a proxy ID) of the service printer, a print request notification that print data has been prepared.

Upon receiving a print job obtaining request from the print job reception unit 332 of the print relay service 370, the print job transfer unit 345 transfers the print job.

(Functions of Web Browser and Printer Processing Unit)

Next, the functions of the Web browser 330 and printer processing unit 336 in the client 130 will be explained. The print relay service 370 is embedded in the Web browser 330.

The Web browser 330 includes a print service printer management unit 331, the print job reception unit 332, a printer management unit 335, a window display unit 333, and a menu display unit 334 in the print relay service 370. The print service printer management unit 331, print job reception unit 332, and window display unit 333 in the print relay service 370 include communication modules (not shown) complying with a communication method with the print service 340. That is, this communication module can communicate with the communicate module of the print service 340.

The print relay service 370 in the Web browser 330 can request the print service 340 to register a service printer.

The service printer registration request is issued when the printer administrator instructs the menu display unit 334 to register a printer, and the print service printer management unit 331 transfers printer registration information to the printer management unit 342 of the print service 340. When transferring printer registration information, the user needs to log in to the print service 340. The login is performed using a user account and password input by the user to a login window which is obtained from the print service 340 and displayed on the window display unit 333. If the user logged in to the print service 340 before, the login may be performed using information stored in the print service printer management unit 331. The user account and password are issued by the print service 340 and registered.

A service printer is linked to a login user account and registered. The printer management unit 335 obtains printer registration information from the printer processing unit 336 corresponding to the printer control unit 321 in the print server 320. The printer registration information includes a printer name, proxy ID, print server information, capabilities, print setting initial values, and status.

FIG. 7C shows an example of printer registration information to be transferred to the print service 340. Print server information is information capable of uniquely identifying the print server 320 which controls a printer. The print server information describes a host name and IP address capable of uniquely specifying a print server on a network. A printer to be registered is a shared printer (in the embodiment, the printer control unit 321) which is registered and shared in the print server 320. The print server information is described when the printer processing unit 336 exists in correspondence with the printer control unit 321 in the print server 320. That is, the print server information is information for identifying the correspondence between a print server and a printer which is linked to the printer and controlled by it.

As a result of transferring printer registration information, the print service printer management unit 331 receives an SPID corresponding to each printer from the print service 340. The print service printer management unit 331 records the received SPID in association with the corresponding printer processing unit 336.

When the print relay service 370 of the Web browser 330 registers a service printer in the print service 340, the print job reception unit 332 requests the print job transfer unit 345 to obtain a print job in response to reception of a print request notification from the print job transfer unit 345 of the print service 340. Alternatively, the print job reception unit 332 periodically checks the presence of a print job in a printer registered in the print job transfer unit 345. If the presence is confirmed, the print job reception unit 332 requests the print job transfer unit 345 to obtain the print job. In the confirmation and obtaining request for a print job, an SPID is sent as an argument, and a print job spooled in the print job queue of a service printer corresponding to the SPID can be confirmed or requested. Upon receiving a print job from the print job transfer unit 345 as a result of the print job obtaining request, the printer management unit 335 transfers the print job to the printer processing unit 336 corresponding to the SPID. In this way, printing by a printer registered by the print relay service 370 can be executed from the print service 340.

(Sharing Setting in Web Browser)

A function of making "sharing setting" of a service printer registered in the print service 340 for a group account or user account in the Web browser 330 will be explained.

First, the menu display unit 334 of the Web browser 330 receives a request from the printer administrator to obtain the printer management window of the print service 340. In response to this, the menu display unit 334 requests the printer management unit 342 of the print service 340 via the window display unit 333 to obtain the printer management window. The window display unit 333 obtains the printer management window from the printer management unit 342, and displays it. In the displayed printer management window, the window display unit 333 receives a service printer sharing setting window request from the printer administrator.

Upon receiving the sharing setting window request from the printer administrator on the printer management window of FIG. 4A or 4B described above, the window display unit 333 transfers a sharing setting window request to the printer management unit 342 of the print service 340. As a response to the sharing setting window request, the window display unit 333 obtains a service printer sharing setting window from the printer management unit 342 and displays it.

When the sharing setting of a service printer is made in one of the sharing setting windows of FIGS. 4C to 4F, a user account or group account having the sharing setting is linked to the service printer. In this shared state, however, a service printer having the sharing setting has not been included yet in a printer list displayed on the printer management window of the print service 340 of the sharing user. Hence, the user cannot transfer a print job to the service printer having the sharing setting. To transfer a print job, the sharing user needs to perform the "sharing registration" procedures. The "sharing registration" procedures will be explained in a description of the Web browser 350.

The printer processing unit 336 includes a communication module (not shown) paired with a communication module in the printer control unit 321 of the print server 320. With this communication module, the printer processing unit 336 can transfer notification information interpretable by the printer control unit 321.

The printer processing unit 336 exists in correspondence with the printer control unit 321. The printer processing unit 336 holds printer information (for example, print server information, printer name, capabilities, and print setting default values) of the corresponding printer control unit 321, and transfers a print job to the printer control unit 321. Software in the client 130 can obtain printer information from the printer processing unit 336 via an interface defined in the client 130, or transfer a print job to the printer control unit 321. In the embodiment, the printer management unit 335 of the Web browser 330 obtains printer information from the printer processing unit 336 via the interface, and transfers a print job.

Although the print relay service 370 is embedded in the Web browser 330 in the client 130 including the printer processing unit 336 in the embodiment, the arrangement is not limited to this. For example, the print relay service 370 may be implemented as a program different from the Web browser 330 running on the client 130. Alternatively, the print relay service 370 may be implemented as a program running on the print server 320 in the print server group 120. Further, the print relay service 370 may be constructed by a server group connected to the Internet similarly to the print service 340, and may not include the Web browser 330 and printer processing unit 336.

(Function of Printer Control Unit)

Next, the function of the printer control unit 321 in the print server 320 of the print server group 120 will be explained.

The printer control unit 321 includes the communication module (not shown) paired with a communication module in the print control unit 310 of the printer. With this communication module, the printer control unit 321 can transfer notification information interpretable by the print control unit 310. Note that a specification defined by a device vendor to perform data communication between the printer control unit 321 and the print control unit 310 is equivalent to the third specification and can be handled by the device vendor. The interface of each communication module is an interface created according to the third specification.

The printer control unit 321 exists in correspondence with the print control unit 310. The printer control unit 321 holds printer information of the corresponding print control unit 310 (for example, a printer name, capabilities, and print setting default values), and transfers a print job to the print control unit 310. Software in the print server 320 can obtain printer information from the printer control unit 321 via an interface defined in the print server 320, or transfer a print job to the printer control unit 321.

(Function of Print Control Unit)

Next, the function of the print control unit 310 in the printer group 110 will be described. The print control unit 310 includes the communication module (not shown) paired with the communication module in the printer control unit 321. With this communication module, the print control unit 310 can receive notification information transferred from the printer control unit 321 and interpret it. Note that the specification defined by a device vendor to perform data communication between the printer control unit 321 and the print control unit 310 is equivalent to the third specification and can be handled by the device vendor. The interface of each communication module is an interface created according to the third specification.

The print control unit 310 obtains a print job described in the notification information transferred from the printer control unit 321, and instructs a printing unit (not shown) to output the obtained print job.

Next, the Web browser 350 of the client 150 will be explained. The Web browser 350 is connected to the print service 340, and displays an obtained printer management window as shown in FIGS. 4A and 4B. The user can confirm available service printers and the status of a print job through the printer management window.

First, when the user of the print service 340 requests display of the printer management window of the print service 340 from the Web browser 350, the Web browser 350 logs in to the printer management unit 342 of the print service 340. The login is performed using a user account and password input by the user to a login window which is obtained from the printer management unit 342 and displayed on the Web browser 350. If the user logged in before, the login may be performed using information stored in the Web browser 350.

If the login is successful, the Web browser 350 obtains, from the printer management unit 342, a printer management window including a list of service printers linked to the login user account, and displays the printer management window. The service printer list does not include a service printer having only the sharing setting. To include a service printer having the sharing setting in the service printer list, the following "sharing registration" procedures need to be performed.

(Sharing Registration in Web Browser)

Details of a function of performing "sharing registration" for service printers having the sharing setting in the printer management window displayed on the Web browser 350 will be described. First, the Web browser 350 receives a service printer sharing registration window request from the user through the above-described printer management window as shown in FIG. 5A.

Upon receiving a service printer sharing registration window request from the user through the printer management window, the Web browser 350 transfers a sharing registration window request to the printer management unit 342 of the print service 340. As a response to the sharing registration window request, the Web browser 350 obtains a sharing registration window from the printer management unit 342 and displays it.

If a service printer is designated and sharing registration is requested in a sharing registration window as shown in FIGS. 5B and 5C, a user account having the sharing setting for the service printer is validated. Then, the sharing user can transfer a print job to the service printer. After that, when the sharing user displays the printer management window of the print service 340 from the Web browser 350, the shared service printer is included and displayed in the printer list. The sharing user can select the displayed service printer and input a print job in accordance with the selection. Note that the sharing user does not have the management authority for a service printer having undergone sharing registration, and cannot instruct to change or delete a setting or make the sharing setting.

The Web browser 350 can instruct the Web print server group 140 to print a content stored in the Web application server group 160. When the Web browser 350 transfers a print instruction to the Web application server group 160, it receives a command to connect to the Web print server group 140, that is, a redirect instruction from the Web application server group 160. In accordance with the received redirect instruction, the Web browser 350 connects to the Web print server group 140. In addition, the Web browser 350 obtains, from the connected Web print server group 140, a list of printers which can be used by the user of the Web browser 350 to print, and displays the list on the printer selection window.

Subsequently, the Web browser 350 obtains, from the Web print server group 140, a print setting window corresponding to a printer selected by the user from the printer list on the printer selection window, and displays the print setting window. When the user instructs execution of printing on the print setting window, the Web browser 350 transfers, to the Web print server group 140, the SPID of the selected service printer and print setting values set by the user on the print setting window, and causes the Web print server group 140 to print.

(Function of Web Application Server Group)

Next, the function of the Web application server group 160 will be described. The Web application server group 160 includes the Web application 360. In the Web application server group 160, a plurality of servers are virtualized and regarded as one server, and this server implements the function of the Web application 360. In the Web application server group 160, a plurality of virtual machines run in one server, and each virtual machine implements the function of the Web application 360.

In the embodiment, the Web application 360 provides a document creation service. For example, when the user wants to distribute materials at a meeting in a company, he uses the document creation service to create the materials. When the client 150 uses the Web application 360, this application need not be installed in the client 150, and the client 150 suffices to include the Web browser 350. The Web application 360 transfers, to the Web browser 350, window information for creating the materials. Note that the Web application 360 logs in based on a user account and password input by the user via the Web browser 350, and if the login is successful, transfers window information for creating the materials.

The Web browser 350 displays, based on the received window information, a creation window for creating a document. By using the creation window, the user creates the materials to be distributed at a meeting. The Web application 360 receives information of the materials created by the user using the creation window, creates a content based on the received information, and stores the created content in the storage device of the Web application server group 160. Note that the Web application 360 provides not only the document creation service, but also a mail service and schedule service.

The user who wants to print the content created using the document creation service presses a print button displayed on the creation window. The Web application 360 receives information representing that the print button has been pressed, and transfers a command to access the Web print server group 140, that is, a redirect instruction to the Web browser 350. Note that the redirect instruction includes a request to obtain a list corresponding to the user of the above-mentioned Web browser 350, content identification information for identifying a content, printing of which is designated by the user, and a user account. When the Web application 360 receives a content obtaining request from the Web print server group 140, it transfers the target content to the Web print server group 140 based on content identification information which has been transferred together with the obtaining request to identify the content. With that, the description of the functions of the respective apparatuses and respective server groups ends.

[Registration Processing Sequence]

A processing sequence of registering a service printer corresponding to the printer control unit 321 of the print server 320 in the print service 340 by using the Web browser 330 including the print relay service 370 in the client 130 will be explained with reference to FIG. 8A.

As a premise, assume that the printer control units 321 corresponding to the respective print control units 310 in the printer group 110 have already been registered as shared printers in the print server 320. Also, assume that the printer processing units 336 corresponding to the printer control units 321 have already been registered in the client 130.

The printer processing unit 336 is registered according to the following procedures. First, when the user designates an IP address or host name for specifying the print server 320, the client 130 connects to the print server 320 based on the designated information. Then, the client 130 obtains and displays a list of shared printers (in the embodiment, the printer control units 321) which have been registered in the print server 320 and shared. When the user designates an arbitrary printer control unit 321 in the list and instructs registration of it, the client 130 transfers a registration request to the designated printer control unit 321. Upon receiving the registration request, the printer control unit 321 of the print server 320 transfers printer information of the printer control unit 321 to the client 130. Based on the received printer information, the client 130 registers the printer processing unit 336 corresponding to the printer control unit 321.

A processing sequence of registering a service printer based on this premise will be explained. First, in step S801, the print relay service 370 in the Web browser 330 receives a service printer registration request to the print service 340 from the user via the menu display unit 334. In step S802, the print relay service 370 issues a login request to the printer management unit 342 in the print service 340. The login request is issued using a user account and password input by the user to a displayed login window which is obtained from the printer management unit 342 by the Web browser 330. If the user logged in before, the login may be performed using a user account and password stored in the Web browser 330. The user account and password are pieces of information which are issued by the print service 340 and stored in the user information storage unit 346.

Upon receiving the login request, the printer management unit 342 of the print service 340 requests login processing of the control unit 343 in step S803. Upon receiving the login processing request, in steps S804 and S805, the control unit 343 performs login processing by obtaining information of the user account and password stored in the user information storage unit 346, and making a comparison. In step S806, the control unit 343 sends back the result of login processing to the printer management unit 342.

In step S807, the printer management unit 342 sends back the result of login processing to the print relay service 370 of the Web browser 330. If the login is successful, the print relay service 370 obtains printer registration information (FIG. 7C) from the printer processing unit 336 in steps S810 and S811. If there are a plurality of printer processing units 336, pieces of printer registration information are obtained. In step S812, the print relay service 370 issues a service printer registration request by transferring the obtained printer registration information to the printer management unit 342 of the print service 340.

In step S813, the printer management unit 342 requests service printer registration processing of the control unit 343. In step S814, based on the printer registration information received from the printer management unit 342, the control unit 343 links service printer information to the login user account and stores it in the printer information storage unit 341. After performing the service printer registration processing, the control unit 343 receives the result of registration processing and the SPID of the registered service printer from the printer information storage unit in step S815. In step S816, the control unit 343 sends back the result of registration processing and the SPID to the printer management unit 342. In step S817, the printer management unit 342 sends back, to the print relay service 370 of the Web browser 330, the result of registration processing and the SPID which have been sent back from the control unit 343. In step S818, the print relay service 370 displays the service printer registration result, links the received SPID to the corresponding printer processing unit 336, and records it.

[Sharing Setting Processing Sequence]

A processing sequence of making "sharing setting" of a service printer registered in the print service 340 by using the Web browser 330 including the print relay service 370 will be explained with reference to FIGS. 8B-1 and 8B-2.

First, when the Web browser 330 receives in step S820 a request from the user via the window display unit 333 to display the printer management window of the print service 340, it logs in to the print service 340 in steps S821 to S826. The processes in steps S821 to S826 are the same as those in steps S802 to S807. If the login is successful, the Web browser 330 requests in step S830 the printer management unit 342 of the print service 340 to obtain a printer management window.

The printer management unit 342 receives the printer management window obtaining request. In steps S831 to S834, the printer management unit 342 obtains a list of service printers linked to the login user account from the printer information storage unit 341 via the control unit 343, and generates a printer management window (FIGS. 4A and 4B). In step S835, the printer management unit 342 sends back the generated printer management window to the Web browser 330.

In step S836, the Web browser 330 displays the sent-back printer management window on the window display unit 333. In step S840, the Web browser 330 receives a service printer sharing setting window request from the user through the printer management window displayed by the window display unit 333.

Upon receiving the sharing setting window request from the user on the printer management window, the Web browser 330 requests a service printer sharing setting window, of the printer management unit 342 of the print service 340 in step S841. Upon receiving the sharing setting window request, the printer management unit 342 generates a sharing setting window (FIGS. 4C to 4F) based on service printer information stored in the printer information storage unit 341 via the control unit 343 in steps S842 to S845. In step S846, the printer management unit 342 sends back the generated sharing setting window to the Web browser 330.

In step S847, the Web browser 330 displays the received sharing setting window on the window display unit 333.

The Web browser 330 accepts a sharing setting request instruction of an arbitrary group account or user account for an arbitrary print server on the sharing setting window. In response to this, in step S850, the Web browser 330 issues, to the printer management unit 342 of the print service 340, the sharing setting request of the designated group account or user account for service printers linked to the designated print server. The printer management unit 342 of the print service 340 receives the sharing setting request from the Web browser 330. In response to this, the printer management unit 342 links the designated group account or user account as a sharing user in steps S851 to S854. More specifically, the printer management unit 342 writes information of the designated group account or user account in sharing user information of the service printer linked to the designated print server in the printer information storage unit 341 via the control unit 343. FIG. 6D shows an example of service printer information stored in the printer information storage unit 341 when the sharing setting of the group account "GroupX" is made for the print server "PrnSrv-X". Information of the group account having the sharing setting is stored in the sharing user information 628.

Since the sharing setting work can be performed for each print server, the administrator can easily make the sharing setting of a necessary service printer for a necessary group or user account.

At this time, however, service printers having the sharing setting have not been included yet in a printer list displayed on the printer management window of the print service 340 of the sharing user. The user cannot transfer a print job to a service printer having the sharing setting. To transfer a print job, the sharing user needs to perform the "sharing registration" procedures. The "sharing registration" processing sequence will be explained in detail with reference to FIGS. 8C-1 and 8C-2.

Then, in step S855, the printer management unit 342 sends back the result of the sharing setting to the Web browser 330. In step S856, the Web browser 330 displays the result of the sharing setting on the window display unit 333.

In the embodiment, when a print server is designated, the sharing setting of service printers linked to the print server is made. However, the form is not limited to this. For example, there is also conceivable a form in which when ability information (information of capabilities) of a service printer is designated, the sharing setting of a service printer having this ability information is made.

[Sharing Registration Processing Sequence]

Next, a processing sequence of performing, by using the Web browser 350 in the client 150, "sharing registration" of a service printer which has been registered in the print service 340 and has the sharing setting will be described with reference to FIGS. 8C-1 and 8C-2.

First, in step S860, the Web browser 350 receives a request from the user to display the printer management window of the print service 340. In response to this, the Web browser 350 logs in to the print service 340 in steps S861 to S866. The processes in steps S861 to S866 are the same as those in steps S821 to S826. If the login is successful, the Web browser 350 obtains a printer management window (FIG. 5A) from the print service 340 and displays it in steps S870 to S876. The processes in steps S870 to S876 are the same as those in steps S830 to S836. Then, in step S880, the Web browser 350 receives a service printer sharing registration window request from the user through the printer management window.

Upon receiving the service printer sharing registration window request from the user, the Web browser 350 transfers a sharing registration window request to the printer management unit 342 of the print service 340 in step S881. Upon receiving the sharing registration window request, the printer management unit 342 of the print service 340 generates, based on information in the printer information storage unit 341 via the control unit 343 in steps S882 to S885, a sharing registration window including a list of service printers having the sharing setting.

In the example of FIG. 6D, for a user belonging to the group account "GroupX", service printers having SPID="5842", "1506", "5126" for which "GroupX" is stored in the sharing user information 628 are generated as a list. In step S886, the printer management unit 342 sends back the generated sharing registration window (FIGS. 5B and 5C) to the Web browser 350. In step S887, the Web browser 350 displays the sharing registration window.

In step S888, the Web browser 350 accepts a sharing registration request for an arbitrary service printer in the sharing registration window. In response to the request, in step S890, the Web browser 350 transfers a request to the printer management unit 342 of the print service 340 to perform sharing registration of the designated service printer. Upon receiving the sharing registration request, the printer management unit 342 performs sharing registration processing in steps S891 to S894. More specifically, the printer management unit 342 rewrites, via the control unit 343 into information representing validation, information of the sharing user status of the designated service printer that is stored in the printer information storage unit 341.

FIG. 6E shows an example of service printer information stored in the printer information storage unit 341 after sharing registration. The user "UserA" performs sharing registration of a service printer having SPID="1506" among service printers having the sharing setting. As a result, information "UserA:Share" representing that the sharing setting has been validated and sharing registration has been performed is stored in the sharing user status information 629. After performing the sharing registration processing, in step S895, the printer management unit 342 sends back the result of sharing registration to the Web browser 350. In step S896, the Web browser 350 displays the result of sharing registration.

Thereafter, when the printer management unit 342 receives a printer management window display request, it displays, in the list, the service printer having undergone sharing registration in accordance with the sharing user status information 629 (FIG. 6E) in the printer information storage unit 341. By selecting the service printer from the list, the sharing user can input a print job to the service printer having undergone sharing registration.

In this fashion, the sharing user can perform sharing registration for only an arbitrary service printer at an arbitrary timing.

As described above, according to the present invention, the sharing setting of a necessary service printer can be easily made for a necessary user account. The user can perform sharing registration for only an arbitrary service printer at an arbitrary timing.

<Second Embodiment>

The first embodiment has described a form in which sharing registration is executed by designating, in the Web browser 350 of the client 150, an arbitrary service printer from a list of service printers having the sharing setting in the print service 340.

In contrast, there is conceivable a form in which a program equivalent to the printer processing unit 336 or a program equivalent to the printer control unit 321 exists in the client 150 in order to hold printer information and transfer a print job to a printer. The second embodiment will explain a form in which a service printer to undergo sharing registration is searched for based on information of a printer processing unit 951 that is registered in a client 150 including a Web browser 950.

[Software Arrangement]

FIG. 9 shows an example of the software arrangements of the respective apparatuses and respective server groups constituting a printing system 1000 according to the second embodiment. Programs which implement the functions of the respective software arrangements shown in FIG. 9 are stored in ROMs 203 of the respective apparatuses and respective server groups. CPUs 202 load the programs to RAMs 204 and execute them, thereby implementing these functions.

In a Web print server group 140, a plurality of servers are virtualized and regarded as one server, and this server implements the function of a print service 940. In the Web print server group 140, a plurality of virtual machines run in one server, and each virtual machine implements the function of the print service 940. The print service 940 shown in FIG. 9 represents one of these virtual machines.

The print service 940 includes a printer information storage unit 941, printer management unit 942, control unit 943, print instruction reception unit 944, print job transfer unit 945, and user information storage unit 946. The printer management unit 942, print instruction reception unit 944, and print job transfer unit 945 include communication modules (not shown), and can perform data communication with the communication module of a Web browser 930 and that of the Web browser 950. The basic function of the print service 940 is the same as that of the print service 340 in the first embodiment, but has even a difference. The difference from the function of the print service 340 will be explained in detail in a description of the processing sequences of FIGS. 12A-1, 12A-2, 12B-1, and 12B-2.

A client 130 includes the Web browser 930, and printer processing units 936a, 936b, 936c, and 936d. A print relay service 970 is embedded in the Web browser 930. The functions of the Web browser 930, print relay service 970, and printer processing units 936a, 936b, 936c, and 936d are the same as those of the Web browser 330, print relay service 370, and printer processing units 336a, 336b, 336c, and 336d in FIG. 3, respectively.

A print server group 120 includes print servers 920a and 920b. The print server 920a includes printer control units 921a and 921b, and the print server 920b includes printer control units 921c and 921d. The functions of the print servers 920a and 920b are the same as those of the print servers 320a and 320b in FIG. 3, respectively.

The client 150 includes the Web browser 950 and printer processing unit 951. The printer processing unit 951 exists in correspondence with the printer control unit 921a in the print server 920a, and holds printer information of the printer control unit 921a. Registration by the printer processing unit 951 is performed according to the same procedures as those of registration by the printer processing unit 336 in FIG. 3. The print server 920a may be in a state in which it cannot be connected from the client 150. One printer processing unit 951 is arranged here, but two or more printer processing units 951 may be arranged.

[Processing Sequence]

A processing sequence of searching service printers having the sharing setting in the print service 940 for a service printer to undergo sharing registration, and registering the service printer in accordance with the detection result will be described with reference to FIGS. 12A-1, 12A-2, 12B-1, and 12B-2. This processing sequence is different from the first embodiment particularly in steps S1230 to S1250.

First, in step S1201, the Web browser 950 receives a request from the user to display the printer management window of the print service 940. In response to this, login to the print service 940 is performed in steps S1202 to S1207. The processes in steps S1202 to S1207 are the same as those in steps S861 to S866 of FIG. 8C-1. If the login is successful, the Web browser 950 obtains a printer management window (FIG. 5A) from the print service 940 and displays it in steps S1210 to S1216. The processes in steps S1210 to S1216 are the same as those in steps S870 to S876 of FIGS. 8C-1 and 8C-2. Then, in step S1220, the Web browser 950 receives a service printer sharing registration window request from the user through the printer management window.

Upon receiving the service printer sharing registration window request from the user, the Web browser 950 obtains a sharing registration window from the print service 940 and displays it in steps S1221 to S1227. The processes in steps S1221 to S1227 are the same as those in steps S881 to S887.

Figure 10A:
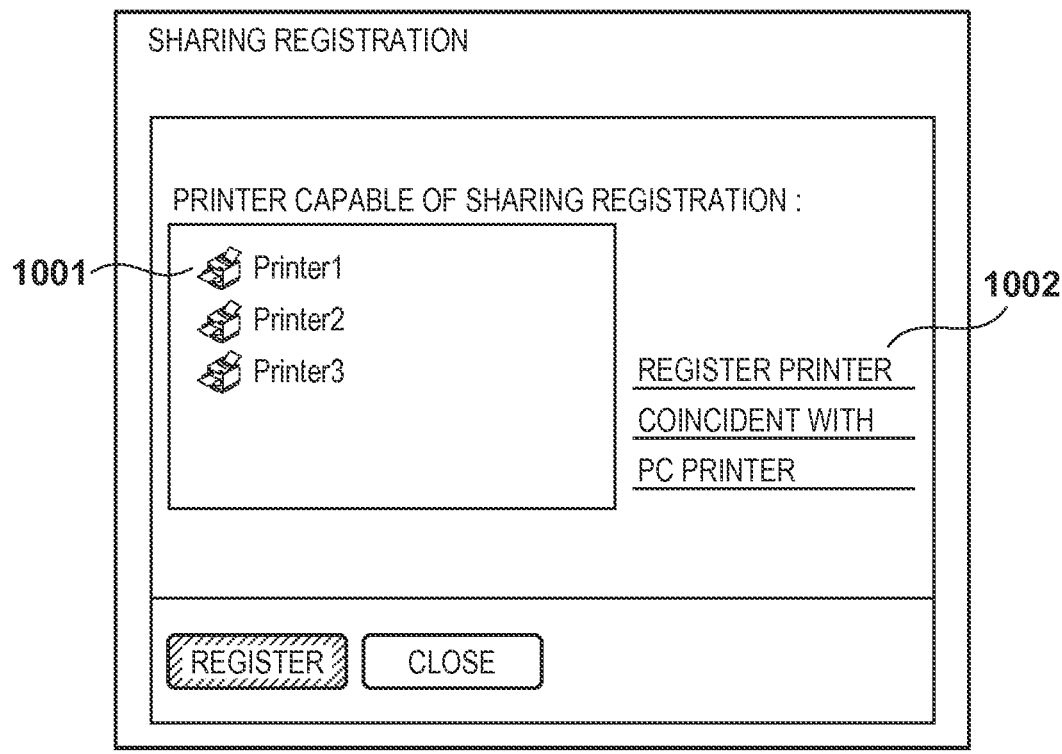
FIG. 10A is a view showing a sharing registration window UI for a service printer.

FIG. 10A shows an example of a sharing registration window displayed on the Web browser 950. A list 1001 displays a list of service printers for which the sharing setting has been made for a user. A button 1002 is used to issue a request to search for a service printer to undergo sharing registration based on printer information registered in the client 150. When the button 1002 is pressed, the Web browser 950 is requested to search for a service printer to undergo sharing registration based on printer information held by the printer processing unit 951.

In step S1230, the Web browser 950 receives the request from the user to search for a service printer to undergo sharing registration based on printer information registered in the client 150. In response to this request, in step S1231, the Web browser 950 transfers a service printer search request to the printer management unit 942 of the print service 940. Upon receiving the service printer search request from the Web browser 950, the printer management unit 942 of the print service 940 transfers a service printer search-in-progress window and printer information request to the Web browser 950 in step S1232. In step S1233, the Web browser 950 displays the obtained search-in-progress window.

Figure 10B:
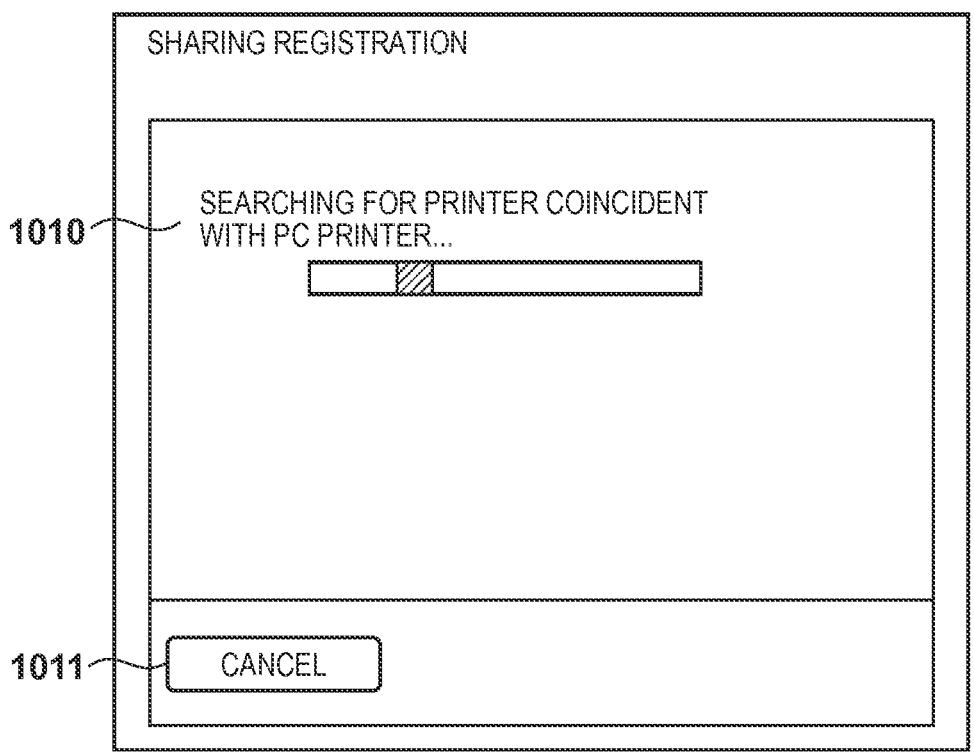
FIG. 10B is a view showing a search-in-progress window UI for service printer information.

FIG. 10B shows an example of a search-in-progress window displayed on the Web browser 950. An area 1010 represents that search is in progress. A button 1011 is used to request the stop of search.

Then, in steps S1234 and S1235, the Web browser 950 requests printer information (FIG. 7D) of the printer processing unit 951 in accordance with the request from the printer management unit 942 of the print service 940, and obtains the printer information. In step S1240, the Web browser 950 transfers the obtained printer information to the printer management unit 942 of the print service 940.

Upon receiving the printer information from the Web browser 950, the printer management unit 942 of the print service 940 obtains a list of service printers having the sharing setting from the printer information storage unit 941 via the control unit 943 in steps S1241 to S1245.

The printer management unit 942 searches the list of service printers having the sharing setting for service printers coincident with the printer information transferred in step S1240. The printer management unit 942 generates, as a service printer coincidence list, the service printers detected to be coincident. A service printer coincidence list generation processing sequence will be explained with reference to FIGS. 11A and 11B. FIG. 11A shows an example of a list of service printers having the sharing setting. FIG. 11B shows an example of printer information transferred in step S1240. As a result of comparing the information in FIG. 11A with the information in FIG. 11B, a service printer having SPID="5842" whose information about the printer name, print server information, capabilities, and print setting initial values coincides with the information in FIG. 11B is generated as a service printer coincidence list.

In the example of FIGS. 11A and 11B, a service printer whose information about the printer name, print server information, capabilities, and print setting initial values coincides with printer information is generated as a service printer coincidence list. However, the form is not limited to this. For example, a service printer whose information coincides with any one piece of printer information may be generated as a service printer coincidence list. In the example of FIGS. 11A and 11B, information of one service printer is coincident. However, when pieces of information of a plurality of service printers are coincident, the plurality of service printers are generated as a coincidence list.

After that, in step S1246, the printer management unit 942 generates a printer search result window based on the service printer coincidence list, and transfers it to the Web browser 950. In step S1247, the Web browser 950 displays the received printer search result window.

Figure 10C:
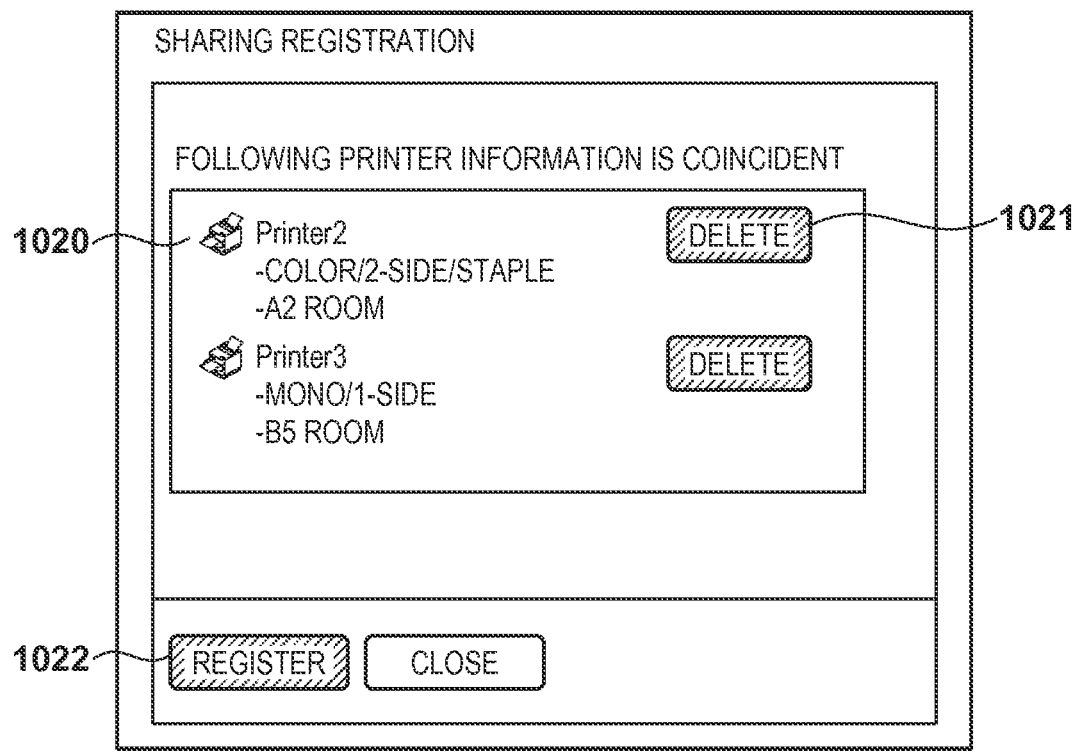
FIG. 10C is a view showing a search result window UI for the service printer information.

FIG. 10C shows an example of the printer search result window. A list 1020 displays the service printer coincidence list together with service printer information. A button 1021 is used to request deletion of a service printer the user does not want to perform sharing registration. When the user presses the button 1021, the corresponding service printer is deleted from the coincidence list and is not displayed any more in the list 1020. A button 1022 is used to request sharing registration. When the user presses the button 1022, sharing registration is executed for service printers displayed in the list 1020.

If sharing registration is instructed in step S1250, the Web browser 950 transfers a sharing registration request for the designated service printer to the print service 940, and the print service 940 performs sharing registration processing in steps S1251 to S1255. In steps S1256 and S1257, the Web browser 950 receives the result of sharing registration processing from the print service 940, and displays the result. The processes in steps S1251 to S1257 are the same as those in steps S890 to S896.

As described above, sharing registration can be easily performed in accordance with a printer driver registered in the client of a user, in addition to the effects of the first embodiment. This further improves the convenience of sharing registration.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-084357, filed Apr. 12, 2013, which is hereby incorporated by reference herein in its entirety.

What is claimed is:

1. A printing server group including a print service of transferring a print job to a printer via a network, comprising at least one processor functioning as:
   an obtaining unit configured to obtain printer information about a printer, user information about a first user, and server information about a print server which centrally manages a plurality of printers, wherein the print server is a server which is different from the printing server group including the print service;
   a storing unit configured to generate, based on the printer information of the printer and the user information, a printer object used when using the printer via the print service, and store the generated printer object in association with the server information of the print server which manages the printer;
   a providing unit configured to, if the first user selects the print server, provide a setting window for instructing to share, with a second user, a plurality of printers managed by the selected print server; and
   a changing unit configured to, if sharing is instructed in the setting window, change a state of printer objects of the respective printers to a shared state to allow the second user to use the printer objects of the respective printers managed by the selected print server,
   wherein the print service transmits a print job to a target printer depending on that the second user instructs to print using printer objects of the respective printers managed by the selected print server.

2. The server group according to claim 1, wherein the setting window allows designating, as the second user, a group including a plurality of users.

3. The server group according to claim 1, further comprising a presenting unit configured to present a registration window for instructing registration of the printer object in the shared state that corresponds to the printer, to allow the second user to select the printer in a print setting window when using the printer via the print service.

4. The server group according to claim 3, further comprising a unit configured to detect, from the printers associated with the printer objects in the shared state, a printer coincident with printer information of a printer that is registered in an information processing apparatus used when the second user uses the print service,
   wherein said presenting unit presents a printer object in the shared state that corresponds to the detected printer.

5. The server group according to claim 3, wherein the registration window displays, in a list, registrable printer objects in the shared state.

6. The server group according to claim 3, wherein the registration window accepts a registration instruction for each printer server which manages registrable printer objects in the shared state.

7. A method of controlling a printing server group including a print service of transferring a print job to a printer via a network, comprising:
   obtaining printer information about a printer, user information about a first user, and server information about a print server which centrally manages a plurality of printers, wherein the print server is a server which is different from the printing server group including the print service;
   generating, based on the printer information of the printer and the user information, a printer object used when using the printer via the print service, and storing the generated printer object in a storage unit in association with the server information of the print server which manages the printer;
   providing, if the first user selects the print server, a setting window for instructing to share, with a second user, a plurality of printers managed by the selected print server; and
   changing, if sharing is instructed in the setting window, a state of printer objects of the respective printers to a shared state to allow the second user to use the printer objects of the respective printers managed by the selected print server,
   wherein the print service transmits a print job to a target printer depending on that the second user instructs to print using printer objects of the respective printers managed by the selected print server.

8. A non-transitory computer-readable medium storing a program that when executed causes a computer to perform a method of controlling a printing server group including a print service of transferring a print job to a printer via a network, the method comprising:
   obtaining printer information about a printer, user information about a first user, and server information about a print server which centrally manages a plurality of printers, wherein the print server is a server which is different from the printing server group including the print service;
   generating, based on the printer information of the printer and the user information, a printer object used when using the printer via the print service, and storing the generated printer object in a storage unit in association with the server information of the print server which manages the printer;
   providing, if the first user selects the print server, a setting window for instructing to share, with a second user, a plurality of printers managed by the selected print server; and
   changing, if sharing is instructed in the setting window, a state of printer objects of the respective printers to a shared state to allow the second user to use the printer objects of the respective printers managed by the selected print server,
   wherein the print service transmits a print job to a target printer depending on that the second user instructs to print using printer objects of the respective printers managed by the selected print server.

* * * * *